United States Patent
Li et al.

(10) Patent No.: US 10,805,885 B2
(45) Date of Patent: Oct. 13, 2020

(54) WAKE-UP METHOD AND DEVICE

(71) Applicant: HUAWEI TECHNOLOGIES CO., LTD., Shenzhen (CN)

(72) Inventors: Yunbo Li, Shenzhen (CN); Xun Zhou, Shenzhen (CN); Yuchen Guo, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/394,064

(22) Filed: Apr. 25, 2019

(65) Prior Publication Data

US 2019/0253973 A1    Aug. 15, 2019

Related U.S. Application Data

(63) Continuation of application No. PCT/CN2017/090707, filed on Jun. 29, 2017.

(30) Foreign Application Priority Data

Oct. 25, 2016 (CN) .......................... 2016 1 0937139

(51) Int. Cl.
*H04W 52/02* (2009.01)

(52) U.S. Cl.
CPC ....... *H04W 52/0235* (2013.01); *H04W 52/02* (2013.01); *H04W 52/0219* (2013.01); *Y02D 70/00* (2018.01)

(58) Field of Classification Search
CPC ..................... H04W 52/0235; H04W 52/0219
See application file for complete search history.

(56) References Cited

U.S. PATENT DOCUMENTS

| | | | |
|---|---|---|---|
| 2013/0301502 A1 | 11/2013 | Kwon et al. | |
| 2014/0050133 A1* | 2/2014 | Jafarian | H04W 52/02 370/311 |

FOREIGN PATENT DOCUMENTS

| | | |
|---|---|---|
| CN | 104206001 A | 12/2014 |
| CN | 104584649 A | 4/2019 |
| WO | 2013032139 A2 | 3/2013 |

* cited by examiner

*Primary Examiner* — Jamal Javaid
(74) *Attorney, Agent, or Firm* — Maier & Maier, PLLC

(57) ABSTRACT

This application provides a wake-up method and device. The method includes: receiving, by a wake-up radio, a first wake-up frame, where the first wake-up frame includes a duration field, and the duration field is used to carry duration information; and waking up, by the wake-up radio, a primary radio based on the duration information. Because a wake-up frame transmitted by an access point includes duration information, a wake-up radio of a station wakes up a primary radio based on the duration information, so that the station can save energy better.

17 Claims, 7 Drawing Sheets

WAKE-UP METHOD AND DEVICE

CROSS-REFERENCE TO RELATED APPLICATIONS

This application is a continuation of International Application No. PCT/CN2017/090707, filed on Jun. 29, 2017, which claims priority to Chinese Patent Application No. 201610937139.8, filed on Oct. 25, 2016. The disclosures of the aforementioned applications are hereby incorporated by reference in their entireties.

TECHNICAL FIELD

Embodiments of this application relate to the wireless local area network field, and more specifically, to a wake-up method and device.

BACKGROUND

In a communication scenario such as the Internet of Things (Internet of Things, IoT), a station is usually powered by a battery, and the station has a very high requirement on low energy consumption. A sleep schedule can greatly reduce the energy consumption. If a sleep period is longer, an energy saving effect is better. However, an excessively long sleep period causes a transmission latency to increase.

To resolve the foregoing problem, usually, a wake-up radio (Wake-up Radio, WUR) is added to the station. The WUR has two running modes: always on and periodically on. In the always-on running mode, the WUR is in an always-on state, or when a primary radio is off, the WUR is in an always-on state. The always-on running mode is simple, and an AP does not need to manage and schedule a turn-on time of the WUR, but the periodically-on running mode has a far better power saving effect. For the periodically-on running mode, a period in which the WUR is on is scheduled by using a target wake time (Target Wake Time, TWT), so that after the TWT arrives, the WUR is turned on and keeps on for a wake-up duration. If a wake-up frame is received within the wake-up duration, the primary radio is woken up to receive data. If no wake-up frame is received within the wake-up duration, the WUR is turned off after the duration expires. The WUR is turned on again when a next TWT arrives.

Therefore, on a basis of adding the WUR to the station, a wake-up method may be provided to further reduce the energy consumption of the station.

SUMMARY

This application provides a wake-up method and device to reduce energy consumption of a station.

A first aspect provides a wake-up method, where the method is performed by a wake-up radio (Wake-up Radio, WUR) of a station, and the method includes: receiving, by the wake-up radio, a first wake-up frame, where the first wake-up frame includes a duration field, and the duration field is used to carry duration information; and waking up, by the wake-up radio, a primary radio based on the duration information.

In the wake-up method according to this application, the wake-up frame received by the wake-up radio includes the duration information, and the wake-up radio wakes up the primary radio based on the duration information, so that the station can save energy better.

With reference to the first aspect, in a possible implementation of the first aspect, the duration information is used to indicate a first time interval between a time point at which the wake-up radio completely receives the first wake-up frame and a time point at which the wake-up radio starts to wake up the primary radio; and the waking up, by the wake-up radio, a primary radio based on the duration information includes: starting, by the wake-up radio, to wake up the primary radio after the first time interval starting from the time point at which the first wake-up frame is completely received.

It may be understood that, after receiving the first wake-up frame, the wake-up radio may wake up the primary radio after a time interval shorter than the first time interval.

With reference to the first aspect, in a possible implementation of the first aspect, the duration information is used to indicate a second time interval between a time point at which the wake-up radio completely receives the first wake-up frame and a time point at which the primary radio is woken up; and the waking up, by the wake-up radio, a primary radio based on the duration information includes: starting, by the wake-up radio, to wake up the primary radio after a third time interval starting from the time point at which the first wake-up frame is completely received, where the third time interval is a difference between the second time interval and a fourth time interval, and the fourth time interval is a time interval between a time point at which the wake-up radio starts to wake up the primary radio and the time point at which the primary radio is woken up.

It may be understood that, after receiving the first wake-up frame, the wake-up radio determines, based on the time interval indicated by the duration information, that the time interval between the time point at which the first wake-up frame is completely received and the time point at which the primary radio is woken up is the second time interval; and the wake-up radio may select to wake up the primary radio after a time interval shorter than the second time interval starting from the time point at which the first wake-up frame is completely received.

With reference to the first aspect or the foregoing implementation of the first aspect, in another possible implementation of the first aspect, the station belongs to a target station group in a plurality of station groups, the first wake-up frame further includes a group identifier field, and the group identifier field is used to carry a group identifier; and before the waking up, by the wake-up radio, a primary radio based on the duration information, the method further includes: determining, by the wake-up radio, that the group identifier carried in the group identifier field is a group identifier of the target station group.

In other words, after the wake-up radio determines, based on the group identifier carried in the group identifier field, that the first wake-up frame is transmitted to the wake-up radio, the wake-up radio parses the first wake-up frame, and wakes up the primary radio based on the duration information in the first wake-up frame.

With reference to the first aspect or the foregoing implementation of the first aspect, in another possible implementation of the first aspect, the plurality of station groups are obtained by an access point by grouping a plurality of stations based on association identifiers AIDs of the stations, AIDs of all stations in each station group belong to a same AID set, AIDs in any two AID sets are completely different, and a correspondence exists between a group identifier of each station group and an AID set; and the determining, by the wake-up radio, that the group identifier carried in the group identifier field is a group identifier of the target station group includes: determining, by the wake-up radio based on the group identifier carried in the group identifier field and the correspondence, that the group identifier carried in the group identifier field is the group identifier of the target station group.

The access point determines a station group based on AIDs of stations, and a correspondence exists between a group identifier of the station group and an AID set. A grouping mechanism is simple. Therefore, the access point does not need to notify the station of grouping information by using dedicated signaling, and signaling overheads can be reduced.

Optionally, the access point notifies the station of a correspondence between the group identifier of the station group and the AID set by using broadcast signaling.

With reference to the first aspect or the foregoing implementation of the first aspect, in another possible implementation of the first aspect, values of AIDs in each AID set are continuous.

With reference to the first aspect or the foregoing implementation of the first aspect, in another possible implementation of the first aspect, the first wake-up frame further includes a traffic indication map (TIM) field, the TIM field includes a bitmap field, the bitmap field is used to carry data indication information, and the data indication information is used to indicate whether each station in the target station group has data to be received; and before the waking up, by the wake-up radio, a primary radio based on the duration information, the method further includes: determining, by the wake-up radio based on the data indication information, that the station has data to be received.

Optionally, each bit in the bitmap (Bitmap) field corresponds to a station (or a WUR); when a bit is set to "0", it represents that a corresponding station has no data to be received, and a WUR of the station may enter an off state; otherwise, when a bit is set to "1", it represents that a corresponding station has data to be received, and a wake-up radio thereof wakes up a primary radio based on the duration information in the wake-up frame.

With reference to the first aspect or the foregoing implementation of the first aspect, in another possible implementation of the first aspect, the first wake-up frame further includes a wake-up frame quantity indication field, the wake-up frame quantity indication field is used to carry wake-up frame quantity indication information, the wake-up frame quantity indication information is used to indicate whether the wake-up radio needs to receive a second wake-up frame in a receive period of the first wake-up frame, and the method further includes: when the wake-up frame quantity indication information indicates that the wake-up radio needs to receive the second wake-up frame in the receive period of the first wake-up frame, receiving, by the wake-up radio, the second wake-up frame in the receive period.

Therefore, the access point may use different wake-up frames for different stations in a same station group, to effectively manage a plurality of stations and further enhance power saving effects of the stations.

Optionally, the wake-up frame quantity indication field may indicate, by using one bit, whether a wake-up frame needs to be received in the receive period, or the wake-up frame quantity indication field may indicate, by using a plurality of bits, a quantity of wake-up frames that further need to be received in the receive period.

A second aspect provides a wake-up method, including: generating, by an access point, a first wake-up frame, where the first wake-up frame includes a duration field, and the duration field is used to carry duration information, so that a wake-up radio of a station wakes up a primary radio based on the duration information; and transmitting, by the access point, the first wake-up frame.

In the wake-up method according to this application, the wake-up frame transmitted by the access point includes the duration information, so that the wake-up radio of the station wakes up the primary radio based on the duration information, and that the station can save energy better.

With reference to the second aspect, in a possible implementation of the second aspect, the duration information is used to indicate a first time interval between a time point at which the wake-up radio completely receives the first wake-up frame and a time point at which the wake-up radio starts to wake up the primary radio.

With reference to the second aspect, in another possible implementation of the second aspect, the duration information is used to indicate a second time interval between a time point at which the wake-up radio completely receives the first wake-up frame and a time point at which the primary radio is woken up.

With reference to the second aspect or the foregoing implementation of the second aspect, in another possible implementation of the second aspect, the first wake-up frame further includes a group identifier field, and the group identifier field is used to carry a group identifier; and the transmitting, by the access point, the first wake-up frame includes: transmitting, by the access point, the first wake-up frame to each station in a target station group.

With reference to the second aspect or the foregoing implementation of the second aspect, in another possible implementation of the second aspect, the method further includes: grouping, by the access point, a plurality of stations based on association identifiers AIDs of the stations to obtain a plurality of station groups, where the plurality of station groups include the target station group, AIDs of all stations in each station group belong to a same AID set, AIDs in any two AID sets are completely different, and a correspondence exists between a group identifier of each station group and an AID set.

The access point determines a station group based on AIDs of stations, and a correspondence exists between a group identifier of the station group and an AID set. A grouping mechanism is simple. Therefore, the access point does not need to notify the station of grouping information by using dedicated signaling, and signaling overheads can be reduced.

Optionally, the access point notifies the station of a relationship between the group identifier of the station group and the AID set by using broadcast signaling.

With reference to the second aspect or the foregoing implementation of the second aspect, in another possible implementation of the second aspect, values of AIDs in each AID set are continuous.

With reference to the second aspect or the foregoing implementation of the second aspect, in another possible implementation of the second aspect, the first wake-up frame further includes a traffic indication map TIM field, the TIM field includes a bitmap field, the bitmap field is used to carry data indication information, and the data indication information is used to indicate whether each station in the target station group has data to be received.

Optionally, each bit in the bitmap (Bitmap) field corresponds to a station (or a WUR); when a bit is set to "0", it represents that a corresponding station has no data to be received, and a WUR of the station may enter an off state; otherwise, when a bit is set to "1", it represents that a corresponding station has data to be received, and a wake-up radio thereof wakes up a primary radio based on the duration information in the wake-up frame.

With reference to the second aspect or the foregoing implementation of the second aspect, in another possible implementation of the second aspect, the first wake-up frame further includes a wake-up frame quantity indication field, the wake-up frame quantity indication field is used to carry wake-up frame quantity indication information, and the wake-up frame quantity indication information is used to indicate whether the access point transmits a second wake-up frame in a transmit period of the first wake-up frame.

A third aspect provides a wake-up method, including: grouping, by an access point, a plurality of stations based on association identifiers (AIDs) of the stations to obtain a plurality of station groups, where AIDs of all stations in each station group belong to a same AID set, AIDs in any two AID sets are completely different, and a correspondence exists between a group identifier of each station group and an AID set; and transmitting, by the access point, a first wake-up frame to a station in a target station group.

In the wake-up method according to this application, the access point determines a station group based on AIDs of stations, and a correspondence exists between a group identifier of the station group and an AID set. A grouping mechanism is simple. Therefore, signaling overheads of the wake-up frame can be reduced.

With reference to the third aspect, in a possible implementation of the third aspect, the first wake-up frame includes a group identifier field, and the group identifier field is used to carry a group identifier of the target station group.

With reference to the third aspect or the foregoing implementation of the third aspect, in another possible implementation of the third aspect, the first wake-up frame further includes a traffic indication map (TIM) field, the TIM field includes a bitmap field, the bitmap field is used to carry data indication information, and the data indication information is used to indicate whether each station in the target station group has data to be received.

Optionally, each bit in the bitmap (Bitmap) field corresponds to a station (or a WUR); when a bit is set to "0", it represents that a corresponding station has no data to be received, and a WUR of the station may enter an off state; otherwise, when a bit is set to "1", it represents that a corresponding station has data to be received.

With reference to the third aspect or the foregoing implementation of the third aspect, in another possible implementation of the third aspect, the first wake-up frame further includes a wake-up frame quantity indication field, the wake-up frame quantity indication field is used to carry wake-up frame quantity indication information, and the wake-up frame quantity indication information is used to indicate whether the access point transmits a second wake-up frame to the station in the target station group in a transmit period of the first wake-up frame.

Therefore, the access point may use different wake-up frames for different stations in a same station group, to effectively manage a plurality of stations and further enhance power saving effects of the stations.

Optionally, the wake-up frame quantity indication field may indicate, by using one bit, whether the access point transmits the second wake-up frame to the station in the target station group in the transmit period of the first wake-up frame, or the wake-up frame quantity indication field may indicate, by using a plurality of bits, a quantity of second wake-up frames that the access point transmits to the station in the target station group in the transmit period of the first wake-up frame.

A fourth aspect provides a wake-up method, including: receiving, by a station, a first wake-up frame by using a wake-up radio, where the station belongs to a target station group in a plurality of station groups, the first wake-up frame includes a group identifier field, the group identifier field is used to carry a group identifier of the target station group, the plurality of station groups are obtained by an access point by grouping a plurality of stations based on association identifiers (AIDs) of the stations, AIDs of all stations in each station group belong to a same AID set, AIDs in any two AID sets are completely different, and a correspondence exists between a group identifier of each station group and an AID set; and parsing the first wake-up frame when the station determines, based on the group identifier of the target station group and the correspondence by using the wake-up radio, that the first wake-up frame needs to be parsed.

In the wake-up method according to this application, the wake-up frame received by the station that belongs to the target station group includes the group identifier field used to carry the group identifier of the target station group, and a correspondence exists between the group identifier and an AID set; and the station determines, based on the group identifier of the target station group and the correspondence, whether the received wake-up frame needs to be parsed. Therefore, signaling overheads of the wake-up frame can be reduced.

With reference to the fourth aspect, in a possible implementation of the fourth aspect, the first wake-up frame further includes a traffic indication map (TIM) field, the TIM field includes a bitmap field, the bitmap field is used to carry data indication information, and the data indication information is used to indicate whether each station in the target station group has data to be received; and the parsing the first wake-up frame when the station determines, based on the group identifier of the target station group and the correspondence by using the wake-up radio, that the first wake-up frame needs to be parsed includes:

when the station determines, based on the group identifier of the target station group and the correspondence by using the wake-up radio, that the first wake-up frame needs to be parsed, parsing the first wake-up frame, and determining, based on the data indication information by using the wake-up radio, whether there is data to be received.

Optionally, each bit in the bitmap (Bitmap) field corresponds to a station (or a WUR); when a bit is set to "0", it represents that a corresponding station has no data to be received, and a WUR of the station may enter an off state; otherwise, when a bit is set to "1", it represents that a corresponding station has data to be received.

With reference to the fourth aspect or the foregoing implementation of the fourth aspect, in another possible implementation of the fourth aspect, the first wake-up frame further includes a wake-up frame quantity indication field, the wake-up frame quantity indication field is used to carry wake-up frame quantity indication information, the wake-up frame quantity indication information is used to indicate whether the access point transmits a second wake-up frame to the station in the target station group in a transmit period of the first wake-up frame, and the method further includes: when the wake-up frame quantity indication information indicates that the access point transmits the second wake-up frame to the station in the target station group in the transmit period of the first wake-up frame, receiving, by the station, the second wake-up frame in the transmit period by using the wake-up radio.

Therefore, the access point may use different wake-up frames for different stations in a same station group, to effectively manage a plurality of stations and further enhance power saving effects of the stations.

Optionally, the wake-up frame quantity indication field may indicate, by using one bit, whether the access point transmits the second wake-up frame to the station in the target station group in the transmit period of the first wake-up frame, or the wake-up frame quantity indication field may indicate, by using a plurality of bits, a quantity of second wake-up frames that the access point transmits to the station in the target station group in the transmit period of the first wake-up frame.

A fifth aspect provides a wake-up method, including: receiving, by an access point, a first message, where the first message includes wake-up latency information, and the wake-up latency information is used to indicate a time interval between a time point at which a wake-up radio of a station successfully and completely receives a wake-up frame transmitted by the access point and a time point at which the wake-up radio wakes up a primary radio of the station; and transmitting, by the access point, data based on the first message.

In the wake-up method according to this application, the transmitted first message received by the access point includes the wake-up latency information, so that the access point can determine, based on the wake-up latency information, a more accurate time for transmitting the data.

With reference to the fifth aspect, in a possible implementation of the fifth aspect, the first message further includes at least one of the following information: channel indication information, wake-up radio operation mode information, and first wake-up frame support information, where the channel indication information is used to indicate channel information of the wake-up radio, the wake-up radio operation mode information is used to indicate an operation mode of the wake-up radio, and the first wake-up frame support information is used to indicate whether the station supports reception of the wake-up frame.

Optionally, the channel information of the wake-up radio includes channel bandwidth information and/or channel location information of the wake-up radio.

Optionally, the operation mode of the wake-up radio includes an always-on mode and/or a periodically-on mode.

With reference to the fifth aspect or the foregoing implementation of the fifth aspect, in another possible implementation of the fifth aspect, the receiving, by an access point, a first message includes: receiving, by the access point, a probe request frame, where the probe request frame carries the first message.

With reference to the fifth aspect or the foregoing implementation of the fifth aspect, in another possible implementation of the fifth aspect, the method further includes: transmitting, by the access point, a second message, where the second message includes at least one of the following information: channel operation information, wake-up frame transmit period information, and second wake-up frame support information, where the channel operation information is used to indicate information of a channel currently used by the access point, the wake-up frame transmit period information is used to indicate a transmit period of the wake-up frame, and the second wake-up frame support information is used to indicate whether the access point supports transmission of the wake-up frame.

With reference to the fifth aspect or the foregoing implementation of the fifth aspect, in another possible implementation of the fifth aspect, the transmitting, by the access point, a second message includes: transmitting, by the access point, a beacon frame, where the beacon frame carries the second message; or transmitting, by the access point, a probe response frame, where the probe response frame carries the second message.

It may be understood that, interaction between the access point and the station in the fifth aspect or the foregoing implementation of the fifth aspect is interaction performed between the primary radio of the access point and the primary radio of the station.

A sixth aspect provides a wake-up method, including: generating, by a station, a first message, where the first message includes wake-up latency information, and the wake-up latency information is used to indicate a time interval between a time point at which a wake-up radio of the station successfully and completely receives a wake-up frame transmitted by an access point and a time point at which the wake-up radio wakes up a primary radio of the station; and transmitting, by the station, the first message by using the primary radio.

In the wake-up method according to this application, the first message transmitted by the station to the access point includes the wake-up latency information. Therefore, the access point can determine, based on the wake-up latency information, a more accurate time for transmitting data and manage wake-up of the station more effectively, and the station can save power better.

With reference to the sixth aspect, in a possible implementation of the sixth aspect, the first message further includes at least one of the following information: channel indication information, wake-up radio operation mode information, and first wake-up frame support information, where the channel indication information is used to indicate channel information of the wake-up radio, the wake-up radio operation mode information is used to indicate an operation mode of the wake-up radio, and the first wake-up frame support information is used to indicate whether the station supports reception of the wake-up frame.

Optionally, the channel information of the wake-up radio includes channel bandwidth information and/or channel location information of the wake-up radio.

Optionally, the operation mode of the wake-up radio includes an always-on mode and/or a periodically-on mode.

With reference to the sixth aspect or the foregoing implementation of the sixth aspect, in another possible implementation of the sixth aspect, the transmitting, by the station, the first message by using the primary radio includes: transmitting, by the station, a probe request frame by using the primary radio, where the probe request frame carries the first message.

With reference to the sixth aspect or the foregoing implementation of the sixth aspect, in another possible implementation of the sixth aspect, the method further includes: receiving, by the station by using the primary radio, a second message, where the second message includes at least one of the following information: channel operation information, wake-up frame transmit period information, and second wake-up frame support information, where the channel operation information is used to indicate information of a channel currently used by the access point, the wake-up frame transmit period information is used to indicate a transmit period of the wake-up frame, and the second wake-up frame support information is used to indicate whether the access point supports transmission of the wake-up frame.

With reference to the sixth aspect or the foregoing implementation of the sixth aspect, in another possible implementation of the sixth aspect, the receiving, by the station, a second message by using the primary radio includes: receiving, by the station, a beacon frame by using the primary radio, where the beacon frame carries the second message; or receiving, by the station, a probe response frame by using the primary radio, where the probe response frame carries the second message.

It should be noted that, in this application, optionally, the wake-up frame transmitted by the access point to the station includes duration information, where the duration information is used to indicate a target time interval, and the duration information is used to instruct the station to enter a sleep state when the station completely receives the wake-up frame, and enter a work state after the target time interval. Therefore, when the access point cannot serve a plurality of station groups simultaneously, wake-up radios of some stations may be woken up after a latency of a time period, so that these stations can save energy.

In this application, optionally, when the access point determines that none of stations in a station group has downlink data to be received in a transmit period of a wake-up frame, the wake-up frame transmitted by the access point to the station is used to instruct the station to turn off a wake-up radio and wait to turn on the wake-up radio in a transmit period of a next wake-up frame, so that the station can save energy.

A seventh aspect provides a wake-up radio of a station, where the wake-up radio is disposed in the station, and the wake-up radio includes: a receiving unit, configured to receive a first wake-up frame, where the first wake-up frame includes a duration field, and the duration field is used to carry duration information; and a processing unit, configured to wake up a primary radio based on the duration information.

The wake-up frame received by the wake-up radio according to this application includes the duration information, and the wake-up radio wakes up the primary radio based on the duration information, so that the station can save energy better.

With reference to the seventh aspect, in a possible implementation of the seventh aspect, the duration information is used to indicate a first time interval between a time point at which the receiving unit completely receives the first wake-up frame and a time point at which the processing unit starts to wake up the primary radio; and the processing unit is specifically configured to start to wake up the primary radio after the first time interval starting from the time point at which the receiving unit completely receives the first wake-up frame.

With reference to the seventh aspect and the foregoing possible implementation of the seventh aspect, in another possible implementation of the seventh aspect, the duration information is used to indicate a second time interval between a time point at which the receiving unit completely receives the first wake-up frame and a time point at which the primary radio is woken up; and the processing unit is specifically configured to start to wake up the primary radio after a third time interval starting from the time point at which the receiving unit completely receives the first wake-up frame, where the third time interval is a difference between the second time interval and a fourth time interval, and the fourth time interval is a time interval between a time point at which the processing unit starts to wake up the primary radio and the time point at which the primary radio is woken up.

With reference to the seventh aspect and the foregoing possible implementation of the seventh aspect, in another possible implementation of the seventh aspect, the station belongs to a target station group in a plurality of station groups, the first wake-up frame further includes a group identifier field, and the group identifier field is used to carry a group identifier; and before the processing unit wakes up the primary radio based on the duration information, the processing unit is further configured to determine that the group identifier carried in the group identifier field is a group identifier of the target station group.

With reference to the seventh aspect and the foregoing possible implementation of the seventh aspect, in another possible implementation of the seventh aspect, the plurality of station groups are obtained by an access point by grouping a plurality of stations based on association identifiers (AIDs) of the stations, AIDs of all stations in each station group belong to a same AID set, AIDs in any two AID sets are completely different, and a correspondence exists between a group identifier of each station group and an AID set; and the processing unit is further configured to determine, based on the group identifier carried in the group identifier field and the correspondence, that the group identifier carried in the group identifier field is the group identifier of the target station group.

With reference to the seventh aspect and the foregoing possible implementation of the seventh aspect, in another possible implementation of the seventh aspect, values of AIDs in each AID set are continuous.

With reference to the seventh aspect and the foregoing possible implementation of the seventh aspect, in another possible implementation of the seventh aspect, the first wake-up frame further includes a traffic indication map (TIM) field, the TIM field includes a bitmap field, the bitmap field is used to carry data indication information, and the data indication information is used to indicate whether each station in the target station group has data to be received; and before the processing unit wakes up the primary radio based on the duration information, the processing unit is further configured to determine, based on the data indication information, that the station has data to be received.

With reference to the seventh aspect and the foregoing possible implementation of the seventh aspect, in another possible implementation of the seventh aspect, the first wake-up frame further includes a wake-up frame quantity indication field, the wake-up frame quantity indication field is used to carry wake-up frame quantity indication information, the wake-up frame quantity indication information is used to indicate whether the receiving unit needs to receive a second wake-up frame in a receive period of the first wake-up frame, and the receiving unit is further configured to receive the second wake-up frame in the receive period when the wake-up frame quantity indication information indicates that the receiving unit needs to receive the second wake-up frame in the receive period of the first wake-up frame.

Each unit of the wake-up radio and functions thereof in the seventh aspect and the foregoing possible implementation of the seventh aspect may correspond to the wake-up method in the first aspect, and each unit of the wake-up radio may implement a corresponding step in the method. For brevity, details are not described herein.

An eighth aspect provides an access point, including: a processing unit, configured to generate a first wake-up frame, where the first wake-up frame includes a duration field, and the duration field is used to carry duration information, so that a wake-up radio of a station wakes up a primary radio based on the duration information; and a transmitting unit, configured to transmit the first wake-up frame.

The wake-up frame transmitted by the access point according to this application to the station includes the duration information, so that the wake-up radio of the station wakes up the primary radio based on the duration information, and that the station can save energy better.

With reference to the eighth aspect, in a possible implementation of the eighth aspect, the duration information is used to indicate a first time interval between a time point at which the wake-up radio completely receives the first wake-up frame and a time point at which the wake-up radio starts to wake up the primary radio.

With reference to the eighth aspect and the foregoing possible implementation of the eighth aspect, in another possible implementation of the eighth aspect, the duration information is used to indicate a second time interval between a time point at which the wake-up radio completely receives the first wake-up frame and a time point at which the primary radio is woken up.

With reference to the eighth aspect and the foregoing possible implementation of the eighth aspect, in another possible implementation of the eighth aspect, the first wake-up frame further includes a group identifier field, and the group identifier field is used to carry a group identifier; and the transmitting unit is specifically configured to transmit the first wake-up frame to each station in a target station group.

With reference to the eighth aspect and the foregoing possible implementation of the eighth aspect, in another possible implementation of the eighth aspect, the processing unit is further configured to group a plurality of stations based on association identifiers (AIDs) of the stations to obtain a plurality of station groups, where the plurality of station groups include the target station group, AIDs of all stations in each station group belong to a same AID set, AIDs in any two AID sets are completely different, and a correspondence exists between a group identifier of each station group and an AID set.

With reference to the eighth aspect and the foregoing possible implementation of the eighth aspect, in another possible implementation of the eighth aspect, values of AIDs in each AID set are continuous.

With reference to the eighth aspect and the foregoing possible implementation of the eighth aspect, in another possible implementation of the eighth aspect, the first wake-up frame further includes a traffic indication map (TIM) field, the TIM field includes a bitmap field, the bitmap field is used to carry data indication information, and the data indication information is used to indicate whether each station in the target station group has data to be received.

With reference to the eighth aspect and the foregoing possible implementation of the eighth aspect, in another possible implementation of the eighth aspect, the first wake-up frame further includes a wake-up frame quantity indication field, the wake-up frame quantity indication field is used to carry wake-up frame quantity indication information, and the wake-up frame quantity indication information is used to indicate whether the transmitting unit transmits a second wake-up frame in a transmit period of the first wake-up frame.

Each unit of the access point and functions thereof in the eighth aspect and the foregoing possible implementation of the eighth aspect may correspond to the wake-up method in the second aspect, and each unit of the access point may implement a corresponding step in the method. For brevity, details are not described herein.

A ninth aspect provides an access point, including: a processing unit, configured to group a plurality of stations based on association identifiers AIDs of the stations to obtain a plurality of station groups, where AIDs of all stations in each station group belong to a same AID set, AIDs in any two AID sets are completely different, and a correspondence exists between a group identifier of each station group and an AID set; and a transmitting unit, configured to transmit a first wake-up frame to a station in a target station group.

The access point according to this application determines a station group based on AIDs of stations, and a correspondence exists between a group identifier of the station group and an AID set. A grouping mechanism is simple. Therefore, signaling overheads of the wake-up frame can be reduced.

With reference to the ninth aspect, in a possible implementation of the ninth aspect, the first wake-up frame includes a group identifier field, and the group identifier field is used to carry a group identifier of the target station group.

With reference to the ninth aspect or the foregoing implementation of the ninth aspect, in another possible implementation of the ninth aspect, the first wake-up frame further includes a traffic indication map (TIM) field, the TIM field includes a bitmap field, the bitmap field is used to carry data indication information, and the data indication information is used to indicate whether each station in the target station group has data to be received.

With reference to the ninth aspect or the foregoing implementation of the ninth aspect, in another possible implementation of the ninth aspect, the first wake-up frame further includes a wake-up frame quantity indication field, the first wake-up frame quantity indication field is used to carry wake-up frame quantity indication information, and the first wake-up frame quantity indication information is used to indicate whether the access point transmits a second wake-up frame to the station in the target station group in a transmit period of the first wake-up frame.

Each unit of the access point and functions thereof in the ninth aspect and the foregoing possible implementation of the ninth aspect may correspond to the wake-up method in the third aspect, and each unit of the access point may implement a corresponding step in the method. For brevity, details are not described herein.

A tenth aspect provides a station, including: a receiving unit, configured to receive a first wake-up frame, where the station belongs to a target station group in a plurality of station groups, the first wake-up frame includes a group identifier field, the group identifier field is used to carry a group identifier of the target station group, the plurality of station groups are obtained by an access point by grouping a plurality of stations based on association identifiers AIDs of the stations, AIDs of all stations in each station group belong to a same AID set, AIDs in any two AID sets are completely different, and a correspondence exists between a group identifier of each station group and an AID set; and a processing unit, configured to parse the first wake-up frame when determining, based on the group identifier of the target station group and the correspondence, that the first wake-up frame needs to be parsed.

The station according to this application belongs to the target station group, the wake-up frame received by the station includes the group identifier field used to carry the group identifier of the target station group, and a correspondence exists between the group identifier and an AID set;

and the station determines, based on the group identifier of the target station group and the correspondence, whether the received wake-up frame needs to be parsed. Therefore, signaling overheads of the wake-up frame can be reduced.

With reference to the tenth aspect, in a possible implementation of the tenth aspect, the first wake-up frame further includes a traffic indication map (TIM) field, the TIM field includes a bitmap field, the bitmap field is used to carry data indication information, and the data indication information is used to indicate whether each station in the target station group has data to be received; and the processing unit is specifically configured to: when determining, based on the group identifier of the target station group and the correspondence, that the first wake-up frame needs to be parsed, parse the first wake-up frame, and determine, based on the data indication information, whether there is data to be received.

With reference to the tenth aspect or the foregoing implementation of the tenth aspect, in another possible implementation of the tenth aspect, the first wake-up frame further includes a wake-up frame quantity indication field, the wake-up frame quantity indication field is used to carry wake-up frame quantity indication information, the wake-up frame quantity indication information is used to indicate whether the access point transmits a second wake-up frame to the station in the target station group in a transmit period of the first wake-up frame, and the receiving unit is further configured to receive the second wake-up frame in the transmit period when the wake-up frame quantity indication information indicates that the access point transmits the second wake-up frame to the station in the target station group in the transmit period of the first wake-up frame.

Each unit of the station and functions thereof in the tenth aspect and the foregoing possible implementation of the tenth aspect may correspond to the wake-up method in the fourth aspect, and each unit of the station may implement a corresponding step in the method. For brevity, details are not described herein.

An eleventh aspect provides an access point, including: a receiving unit, configured to receive a first message, where the first message includes wake-up latency information, and the wake-up latency information is used to indicate a time interval between a time point at which a wake-up radio of a station successfully and completely receives a wake-up frame transmitted by the access point and a time point at which the wake-up radio wakes up a primary radio of the station; and a transmitting unit, further configured to transmit data based on the first message.

The transmitted first message received by the access point according to this application includes the wake-up latency information, so that a more accurate time for transmitting the data can be determined based on the wake-up latency information.

With reference to the eleventh aspect, in a possible implementation of the eleventh aspect, the first message further includes at least one of the following information: channel indication information, wake-up radio operation mode information, and first wake-up frame support information, where the channel indication information is used to indicate channel information of the wake-up radio, the wake-up radio operation mode information is used to indicate an operation mode of the wake-up radio, and the first wake-up frame support information is used to indicate whether the station supports reception of the wake-up frame.

With reference to the eleventh aspect or the foregoing implementation of the eleventh aspect, in another possible implementation of the eleventh aspect, the receiving unit is specifically configured to receive a probe request frame, where the probe request frame carries the first message.

With reference to the eleventh aspect or the foregoing implementation of the eleventh aspect, in another possible implementation of the eleventh aspect, the transmitting unit is further configured to transmit a second message, where the second message includes at least one of the following information: channel operation information, wake-up frame transmit period information, and second wake-up frame support information, where the channel operation information is used to indicate information of a channel currently used by the access point, the wake-up frame transmit period information is used to indicate a transmit period of the wake-up frame, and the second wake-up frame support information is used to indicate whether the access point supports transmission of the wake-up frame.

With reference to the eleventh aspect or the foregoing implementation of the eleventh aspect, in another possible implementation of the eleventh aspect, the transmitting unit is specifically configured to: transmit a beacon frame, where the beacon frame carries the second message; or transmit a probe response frame, where the probe response frame carries the second message.

Each unit of the access point and functions thereof in the eleventh aspect and the foregoing possible implementation of the eleventh aspect may correspond to the wake-up method in the fifth aspect, and each unit of the access point may implement a corresponding step in the method. For brevity, details are not described herein.

A twelfth aspect provides a station, including: a processing unit, configured to generate a first message, where the first message includes wake-up latency information, and the wake-up latency information is used to indicate a time interval between a time point at which a wake-up radio of the station successfully and completely receives a wake-up frame transmitted by the access point and a time point at which the wake-up radio wakes up a primary radio of the station; and a transceiver unit, configured to transmit the first message.

The first message transmitted by the station according to this application to the access point includes the wake-up latency information. Therefore, the access point can determine, based on the wake-up latency information, a more accurate time for transmitting data and manage wake-up of the station more effectively, and the station can save power better.

With reference to the twelfth aspect, in a possible implementation of the twelfth aspect, the first message further includes at least one of the following information: channel indication information, wake-up radio operation mode information, and first wake-up frame support information, where the channel indication information is used to indicate channel information of the wake-up radio, the wake-up radio operation mode information is used to indicate an operation mode of the wake-up radio, and the first wake-up frame support information is used to indicate whether the station supports reception of the wake-up frame.

With reference to the twelfth aspect or the foregoing implementation of the twelfth aspect, in another possible implementation of the twelfth aspect, the transceiver unit is specifically configured to transmit a probe request frame, where the probe request frame carries the first message.

With reference to the twelfth aspect or the foregoing implementation of the twelfth aspect, in another possible implementation of the twelfth aspect, the transceiver unit is further configured to receive a second message, where the second message includes at least one of the following information: channel operation information, wake-up frame transmit period information, and second wake-up frame support information, where the channel operation information is used to indicate information of a channel currently used by the access point, the wake-up frame transmit period information is used to indicate a transmit period of the wake-up frame, and the second wake-up frame support information is used to indicate whether the access point supports transmission of the wake-up frame.

With reference to the twelfth aspect or the foregoing implementation of the twelfth aspect, in another possible implementation of the twelfth aspect, the transceiver unit is specifically configured to: receive a beacon frame, where the beacon frame carries the second message; or receive a probe response frame, where the probe response frame carries the second message.

Each unit of the station and functions thereof in the twelfth aspect and the foregoing possible implementation of the twelfth aspect may correspond to the wake-up method in the sixth aspect, and each unit of the station may implement a corresponding step in the method. For brevity, details are not described herein.

A thirteenth aspect provides a wake-up radio of a station, where the wake-up radio includes a processor, a memory, and a receiver, where the processor, the memory, and the receiver are connected by a bus, the memory is configured to store an instruction, and the processor is configured to invoke the instruction stored in the memory to control the receiver to receive information, so that the wake-up radio performs the method in the first aspect or any possible implementation of the first aspect.

A fourteenth aspect provides an access point, including a processor, a memory, and a transceiver, where the processor, the memory, and the transceiver are connected by a bus, the memory is configured to store an instruction, and the processor is configured to invoke the instruction stored in the memory to control the transceiver to receive or transmit information, so that the access point performs the method in the second aspect or any possible implementation of the second aspect.

A fifteenth aspect provides an access point, including a processor, a memory, and a transceiver, where the processor, the memory, and the transceiver are connected by a bus, the memory is configured to store an instruction, and the processor is configured to invoke the instruction stored in the memory to control the transceiver to receive or transmit information, so that the access point performs the method in the third aspect or any possible implementation of the third aspect.

A sixteenth aspect provides a station, including a processor, a memory, and a wake-up radio, where the processor, the memory, and the wake-up radio are connected by a bus system, the memory is configured to store an instruction, and the processor is configured to invoke the instruction stored in the memory to control the wake-up radio to receive information, so that the station performs the method in the fourth aspect or any possible implementation of the fourth aspect.

A seventeenth aspect provides an access point, including a processor, a memory, and a transceiver, where the processor, the memory, and the transceiver are connected by a bus system, the memory is configured to store an instruction, and the processor is configured to invoke the instruction stored in the memory to control the transceiver to receive or transmit information, so that the access point performs the method in the fifth aspect or any possible implementation of the fifth aspect.

An eighteenth aspect provides a station, including a processor, a memory, and a primary radio, where the processor, the memory, and the primary radio are connected by a bus system, the memory is configured to store an instruction, and the processor is configured to invoke the instruction stored in the memory to control the primary radio to receive or transmit information, so that the station performs the method in the sixth aspect or any possible implementation of the sixth aspect.

A nineteenth aspect provides a computer-readable medium, configured to store a computer program, where the computer program includes an instruction used to perform the method in the first aspect or any possible implementation of the first aspect.

A twentieth aspect provides a computer-readable medium, configured to store a computer program, where the computer program includes an instruction used to perform the method in the second aspect or any possible implementation of the second aspect.

A twenty-first aspect provides a computer-readable medium, configured to store a computer program, where the computer program includes an instruction used to perform the method in the third aspect or any possible implementation of the third aspect.

A twenty-second aspect provides a computer-readable medium, configured to store a computer program, where the computer program includes an instruction used to perform the method in the fourth aspect or any possible implementation of the fourth aspect.

A twenty-third aspect provides a computer-readable medium, configured to store a computer program, where the computer program includes an instruction used to perform the method in the fifth aspect or any possible implementation of the fifth aspect.

A twenty-fourth aspect provides a computer-readable medium, configured to store a computer program, where the computer program includes an instruction used to perform the method in the sixth aspect or any possible implementation of the sixth aspect.

DESCRIPTION OF EMBODIMENTS

The following clearly describes the technical solutions in the embodiments of this application with reference to the accompanying drawings in the embodiments of this application.

A wake-up method in the embodiments of this application may be applied to a wireless local area network (Wireless Local Area Network, WLAN), or may be applied to other various communications systems, such as a Global System for Mobile Communications (Global System for Mobile communications, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, an LTE frequency division duplex (Frequency Division Duplex, FDD) system, an LTE time division duplex (Time Division Duplex, TDD), a Universal Mobile Telecommunications System (Universal Mobile Telecommunications System, UMTS), a Worldwide Interoperability for Microwave Access (Worldwide Interoperability for Microwave Access, WiMAX) communications system, and a future communications system.

Figure 1:
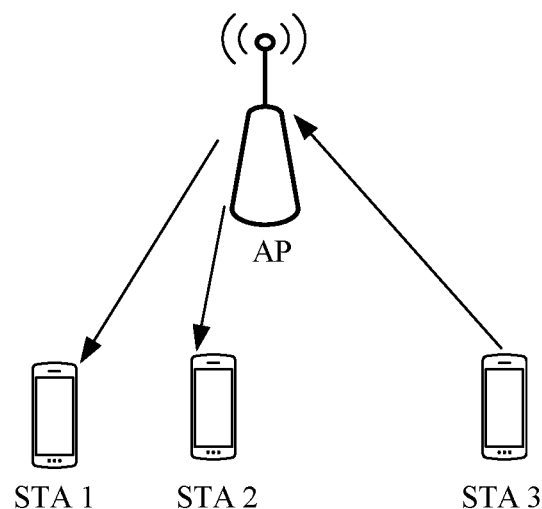
FIG. 1 is a schematic diagram of an application scenario according to an embodiment of this application.

FIG. 1 is a schematic diagram of an application scenario according to an embodiment of this application. A WLAN shown in FIG. 1 includes a transmitting device (for example, an access point (Access Point, AP) shown in FIG. 1) and a receiving device (for example, a station (Station, STA) shown in FIG. 1). The AP is responsible for performing bidirectional communication with a plurality of STAs. For example, the AP shown in FIG. 1 transmits downlink data to the STA (for example, a STA 1 and a STA 2 in FIG. 1), or the AP receives uplink data from the STA (for example, a STA 3 in FIG. 1). It should be understood that, a quantity of APs and a quantity of STAs shown in FIG. 1 are merely examples, and the WLAN may include any quantity of APs and any quantity of STAs.

Figure 2:
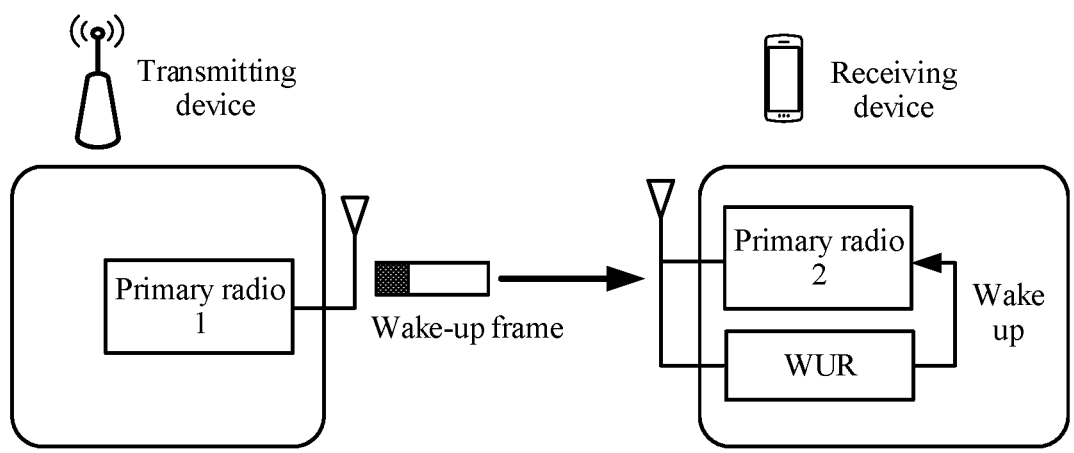
FIG. 2 is a schematic diagram of interaction between a transmitting device and a receiving device in a conventional low energy consumption solution.

FIG. 2 is a schematic diagram of interaction between a transmitting device and a receiving device in a conventional low energy consumption solution. The receiving device includes a primary radio 2 and a wake-up radio (Wake-up Radio, WUR). The transmitting device includes a primary radio 1. After the primary radio 2 of the receiving device falls in sleep, the low-power WUR wakes up and starts to work. If the transmitting device needs to communicate with the receiving device, the transmitting device first transmits a wake-up frame to the WUR of the receiving device by using a WUR channel. After correctly receiving the wake-up frame transmitted to the WUR, the WUR wakes up the primary radio 2 of the receiving device. By using the primary radio 1, the transmitting device communicates with the primary radio 2 that is woken up. After the primary radio 2 completes communication with the transmitting device, the WUR listens to the WUR channel and determine whether a wake-up frame is transmitted to the WUR, to wake up the primary radio 2 when receiving the wake-up frame.

In the foregoing technology, a low-power WUR is used to replace the primary radio 2 to listen to a channel when the receiving device is idle. This can effectively reduce energy waste of the receiving device in idle listening. To achieve low power consumption, the WUR generally has low complexity in terms of a circuit structure design, a frame (for example, a wake-up frame) structure design, and the like. Energy consumption of the WUR in a listening state is about 0.1-1% of power consumption of the primary radio 2, that is, less than 100 uW.

It should be understood that, a primary radio of a receiving device can be woken up only by a corresponding WUR of the receiving device. Generally, the primary radio may also be referred to as a primary radio module, a primary radio frequency module, or a primary radio frequency unit. Unless otherwise specified in this specification, both the primary radio and the WUR are a primary radio and a WUR of a same receiving device. A transmitting device may include a WUR or may not include a WUR. When the transmitting device does not include a WUR, a primary radio of the transmitting device may also be considered as a conventional transceiver.

It should be understood that, a purpose of the wake-up radio is to enable the primary radio to be in an on (ON) state, that is, in a wake-up state. Therefore, "waking up the primary radio" includes the following cases: if the primary radio is originally in an off (OFF) state, that is, in a sleep state; "waking up the primary radio" means changing the primary radio to the ON state; or if the primary radio is originally in the ON state, "waking up the primary radio" means keeping the primary radio in the ON state.

It should also be understood that, "the WUR is off" may also be described as "the WUR enters the sleep state or a power saving state"; and "the WUR is on" may also be described as "the WUR enters the wake-up state or a work state".

As functions of wireless devices are increasingly diversified, the Internet of Things (Internet of Things, IoT) has become a development trend of a future wireless network. How to reduce energy consumption of a station in the IoT is a critical problem currently.

Figure 3:
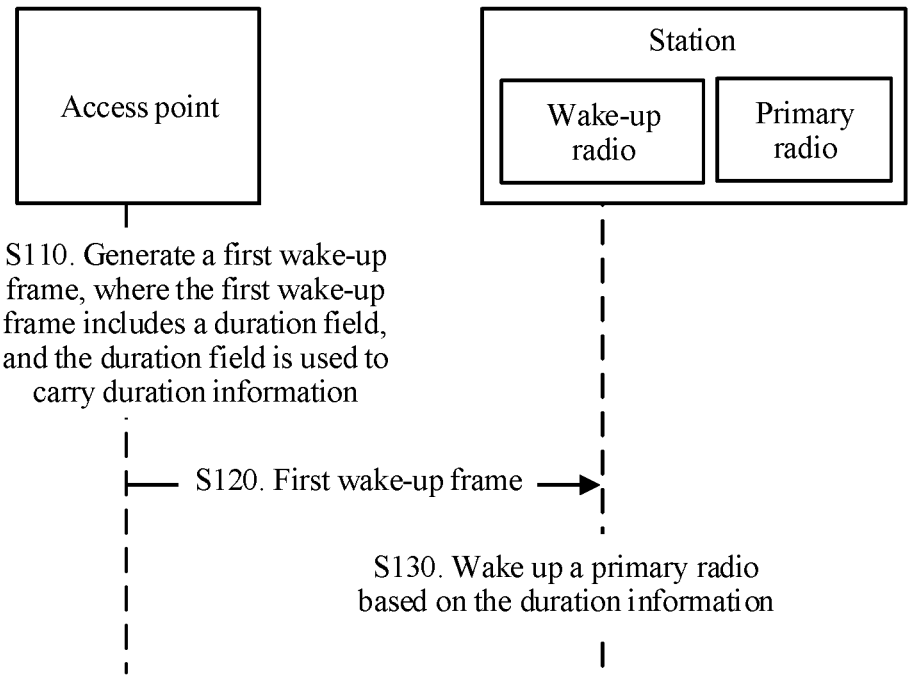
FIG. 3 is a schematic flowchart of a wake-up method according to an embodiment of this application.

To resolve the foregoing problem, an embodiment of this application provides a wake-up method. FIG. 3 is a schematic flowchart of a wake-up method 100 according to an embodiment of this application. The method 100 includes the following steps.

S110. An access point generates a first wake-up frame, where the first wake-up frame includes a duration field, and the duration field is used to carry duration information.

S120. The access point transmits the first wake-up frame to a station, and a wake-up radio of the station receives the first wake-up frame transmitted by the access point.

S130. The wake-up radio wakes up a primary radio based on the duration information.

Optionally, in an embodiment, the duration information is used to indicate a first time interval between a time point at which the wake-up radio completely receives the first wake-up frame and a time point at which the wake-up radio starts to wake up the primary radio. Correspondingly, the wake-up radio starts to wake up the primary radio after the first time interval starting from the time point at which the first wake-up frame is completely received.

It may be understood that, the wake-up radio may start to wake up the primary radio after a time interval shorter than the first time interval and starting from the time point at which the first wake-up frame is completely received.

For example, the first time interval indicated by the duration information is T1, and a value of T1 is not limited in this application. When the value of T1 is 0, it indicates that the wake-up radio wakes up the primary radio immediately after the first wake-up frame is completely received. When the value of T1 is not 0, it indicates that after the first wake-up frame is completely received, the wake-up radio starts to wake up the primary radio after waiting for a time T1.

Optionally, in another example, the duration information is used to indicate a second time interval between a time point at which the wake-up radio completely receives the first wake-up frame and a time point at which the wake-up radio is woken up. Correspondingly, the wake-up radio determines, based on the second time interval, a time point at which the wake-up radio starts to wake up the primary radio, and starts to wake up the primary radio at the determined time. Therefore, when there are a lot of stations having downlink data, but the access point cannot serve so many stations simultaneously, some stations may be woken up after a latency of a time period, so that these stations do not need to wake up primary radios in the time period, thereby further saving energy.

For example, the second time interval indicated by the duration information is T2, and a value of T2 is not limited in this application. A time interval between the time point at which the wake-up radio starts to wake up the primary radio and the time point at which the primary radio is woken up is T3. In this case, the wake-up radio needs to start to wake up the primary radio after T2-T3 starting from the time point at which the first wake-up frame is completely received.

In the foregoing embodiment, optionally, the station belongs to a target station group in a plurality of station groups, the first wake-up frame transmitted by the access point to the station further includes a group identifier field, and the group identifier field is used to carry a group identifier. After receiving the first wake-up frame, the station determines whether the first wake-up frame is a wake-up frame transmitted to the station; and if determining that the first wake-up frame is a wake-up frame transmitted to the station, the station parses the first wake-up frame, and wakes up the primary radio based on the duration information in the first wake-up frame. It should be noted that, the target station group is any one of the plurality of station groups.

In this embodiment of this application, the access point may group stations based on a preset condition to obtain a plurality of station groups. For example, the access point groups the stations based on a service type of each station to obtain a plurality of station groups. Specifically, the access point groups stations of a same service type into one group.

For example, the access point may perform grouping based on different latency requirements of stations, and group stations having similar latency requirements into one group to obtain a plurality of station groups, so that stations in each station group obtain a same latency effect.

For another example, the access point groups stations based on association identifiers (Association ID, AID) of the stations, and groups stations whose AIDs are in a range into one group; or it may be understood that, AIDs of all stations in each station group belong to a same AID set, AIDs in any two AID sets are completely different, and a correspondence exists between a group identifier of each station group and an AID set. Therefore, the station may determine, based on the group identifier carried in the group identifier field, whether the first wake-up frame is a wake-up frame transmitted to the station.

The AIDs of all the stations in each station group may be continuous, or each station group includes stations corresponding to a segment of continuous AIDs. The AIDs of all the stations in each station group may also be discontinuous. This is not limited in this application.

For example, a group identifier of a station group 1 is a group identifier 1, a group identifier of a station group 2 is a group identifier 2, a group identifier of a station group 3 is a group identifier 3, the group identifier 1 corresponds to an AID set 1, the group identifier 2 corresponds to an AID set 2, the group identifier 3 corresponds to an AID set 3, values of AIDs in the AID set 1 are between 100 and 150, values of AIDs in the AID set 2 are between 150 and 200, and values of AIDs in the AID set 3 are between 200 and 250. If an AID of the station is 160, the station belongs to the station group 2. If the group identifier carried in the group identifier field in the first wake-up frame is the group identifier 2, the station considers that the first wake-up frame is a wake-up frame transmitted to the station, and the station needs to parse the first wake-up frame; otherwise, the station considers that the first wake-up frame is not a wake-up frame transmitted to the station, and the station does not need to parse the first wake-up frame, thereby further saving energy.

In an embodiment, a correspondence between a group identifier and an AID set may be preset. The correspondence between the group identifier and the AID set may be further notified to all stations by the access point by broadcast after grouping is performed based on AIDs of the stations.

Further, a division manner of the AID set may be preset. The division manner of the AID set may be notified by the access point to all the stations by broadcast. The access point may notify values of AIDs included in each AID set to the stations. Alternatively, the access point may notify a minimum value and a maximum value of AIDs in each AID set to the stations, and indicate that values of AIDs in each AID set are continuous. Alternatively, the access point may notify only a minimum value of an AID in each AID set and a quantity of AIDs in each AID set to the stations, and indicate that values of AIDs in each AID set are continuous.

In all the foregoing embodiments, each station group has its own wake-up period, and a station in each station group turns on a WUR based on the wake-up period of the group to receive a wake-up frame. The wake-up period of each station group may be determined by the access point based on a service period of the station in each station group.

Figure 4:
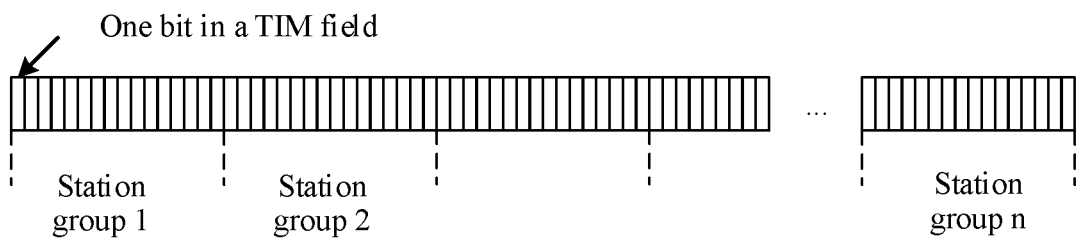
FIG. 4 is a schematic diagram of a grouping manner according to an embodiment of this application.

In this embodiment of this application, optionally, the first wake-up frame further includes a traffic indication map (Traffic Indication Map, TIM) field. As shown in FIG. 4, the TIM field includes a bitmap (Bitmap) field, and each bit in the Bitmap corresponds to a station (or a WUR). When a bit is set to "0", it represents that a corresponding station has no data to be received, and a WUR of the station may enter a sleep state; otherwise, if a bit is set to "1", it represents that a corresponding station has data to be received.

In all the foregoing embodiments, optionally, to use different wake-up frames for different stations in a group, the access point transmits a plurality of wake-up frames in a wake-up period. The first wake-up frame includes a wake-up frame quantity indication field, the wake-up frame quantity indication field is used to carry wake-up frame quantity indication information, and the wake-up frame quantity indication information is used to indicate whether the wake-up radio needs to receive a second wake-up frame in a receive period of the first wake-up frame.

It may be understood that, the second wake-up frame is a collective term for wake-up frames transmitted after the first wake-up frame, and does not definitely indicate one wake-up frame. In addition, the second wake-up frame may also include a wake-up frame quantity indication field.

Figure 5:
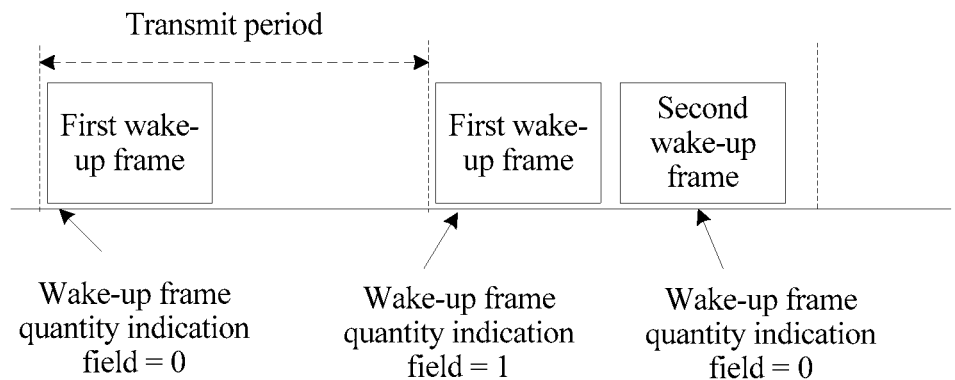
FIG. 5 is a schematic diagram of a method for transmitting a wake-up frame according to an embodiment of this application.

For example, as shown in FIG. 5, the wake-up frame quantity indication field may be one bit, and when the bit is set to "0", it indicates that the access point has no more wake-up frames to be transmitted in a transmit period, or when the bit is set to "1", it indicates that the access point still has a wake-up frame to be transmitted in a transmit period.

Alternatively, further, when the first wake-up frame carries the group identifier field, the wake-up frame quantity indication field may be used to indicate whether the access point has more wake-up frames carrying a same group identifier and to be transmitted in a transmit period.

Still further, the wake-up frame quantity indication field may be a plurality of bits, and is used to indicate a quantity of wake-up frames to be transmitted in a transmit period.

It should be noted that, when the wake-up frame quantity indication information in the first wake-up frame indicates that the access point still has a wake-up frame to be transmitted in the transmit period, the wake-up frame transmitted after the first wake-up frame by the access point to all stations in the target station group may be intended only for some stations in the target station group. Alternatively, it may be understood that, the access point may divide the target station group into a plurality of smaller station groups based on the AIDs of the stations. A group identifier carried in the wake-up frame transmitted after the first wake-up frame by the access point to all stations in the target station group corresponds to only some of the smaller station groups. Therefore, only stations in some of the smaller station groups need to parse the wake-up frame received after the first wake-up frame, and stations in other smaller station groups do not need to parse the wake-up frame received after the first wake-up frame. Therefore, energy can be saved.

Figure 6:
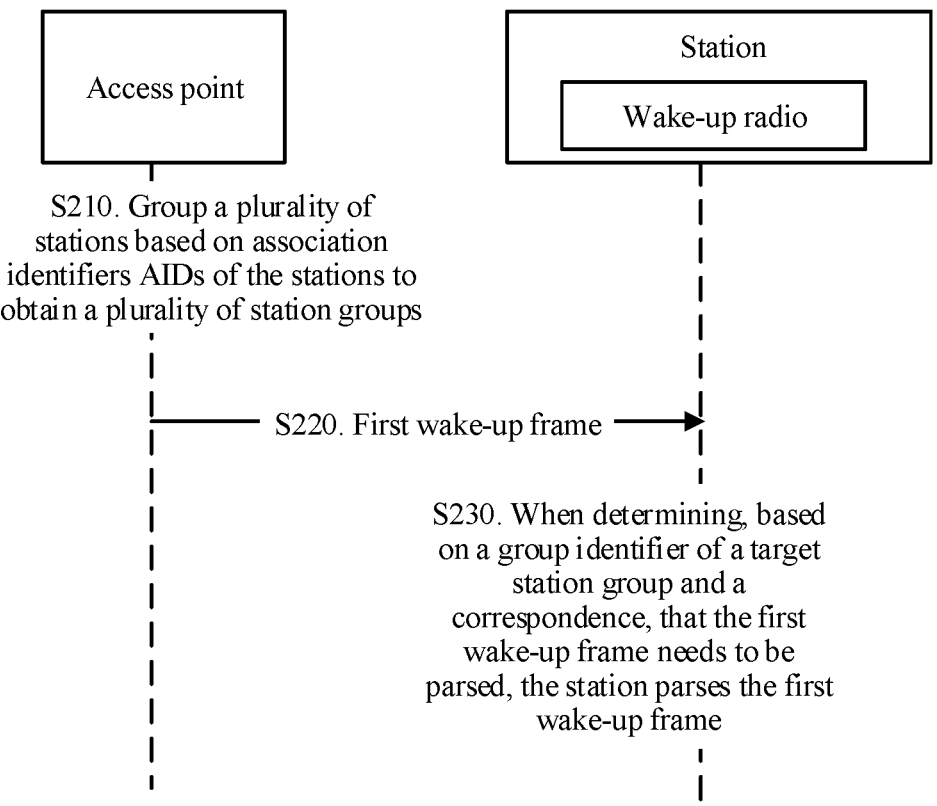
FIG. 6 is a schematic flowchart of a wake-up method according to another embodiment of this application.

It should be understood that, in this embodiment of this application, the embodiment about grouping the stations by the access point based on the AIDs of the stations may be performed on a basis of the method 100 or may be performed separately. When the embodiment about grouping the stations by the access point based on the AIDs of the stations is performed separately, another embodiment of this application provides another wake-up method. As shown in FIG. 6, the method 200 includes the following steps.

S210. An access point groups a plurality of stations based on association identifiers AIDs of the stations to obtain a plurality of station groups.

AIDs of all stations in each station group belong to a same AID set, AIDs in any two AID sets are completely different, and a correspondence exists between a group identifier of each station group and an AID set.

S220. The access point transmits a first wake-up frame to a station in a target station group, and the station receives the first wake-up frame.

S230. When determining, based on a group identifier of the target station group and a correspondence, that the first wake-up frame needs to be parsed, the station parses the first wake-up frame.

It may be understood that, the first wake-up frame transmitted by the access point to the target station group may be referred to as a "group wake-up frame".

Optionally, in an example, the first wake-up frame includes a TIM field, and information carried in the TIM field is the same as that in the method 100. Details are not described again herein to avoid repetition.

Optionally, in another example, the first wake-up frame further includes a wake-up frame quantity indication field, and information carried in the wake-up frame quantity indication field is the same as that in the method 100. Details are not described again herein to avoid repetition.

In an embodiment, when the access point needs to transmit a multicast or unicast wake-up frame to a station in a station group, but the access point cannot serve a plurality of station groups simultaneously, the access point may control wake-up radios of some stations to be off for a time period after the stations receive the wake-up frame and then to enter a work state, so that the stations can save energy.

Specifically, the first wake-up frame transmitted by the access point to the station carries a time field, where the time field is used to carry time information, and the time information is used to indicate that when the wake-up radio determines that the station has no data to be received, the wake-up radio enters a sleep state from the work state at a time of completely receiving the first wake-up frame and enters the work state after a preset time interval starting from the time of entering the sleep state.

In another embodiment, when the access point determines that none of stations in the target station group has downlink data to be received in a wake-up period, the first wake-up frame may be a special wake-up frame, and the first wake-up frame is used to instruct all the stations in the target station group to turn off wake-up radios and turn on the wake-up radios in a next wake-up period.

For example, the TIM field in the first wake-up frame is used to indicate that none of the stations in the target station group has downlink data to be received. For example, all bits in the TIM field are set to "0", or a bitmap length of the TIM field is set to "0".

Figure 7:
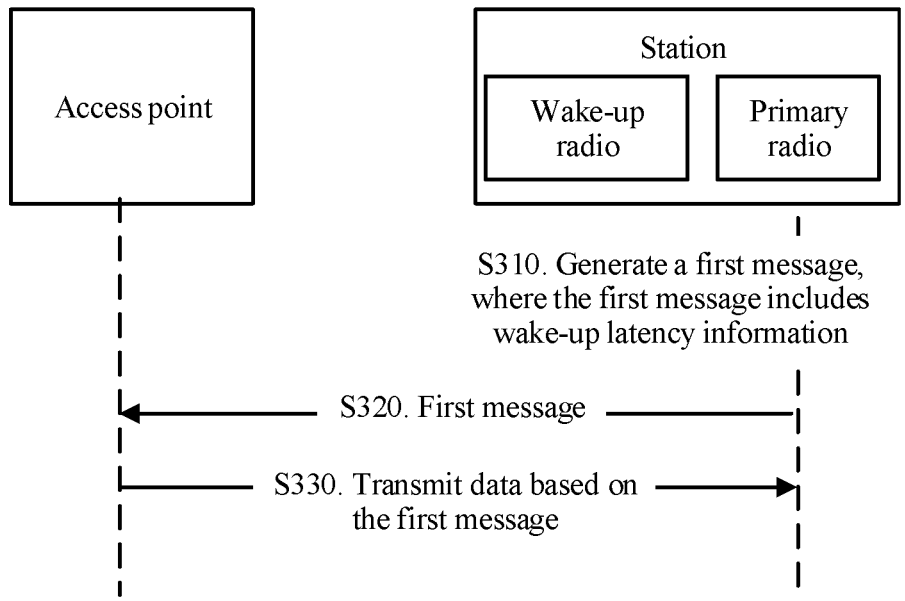
FIG. 7 is a schematic flowchart of a wake-up method according to still another embodiment of this application.

In this embodiment of this application, to support a wake-up mechanism, the access point needs to negotiate a wake-up capability with the station by using a primary radio and set a parameter for operating the wake-up radio. Therefore, an embodiment of this application provides another wake-up method. As shown in FIG. 7, the method 300 includes the following steps.

S310. A station generates a first message, where the first message includes wake-up latency information, and the wake-up latency information is used to indicate a time interval between a time point at which a wake-up radio of the station successfully and completely receives a wake-up frame transmitted by an access point and a time point at which the wake-up radio wakes up a primary radio of the station.

S320. The station transmits the first message to the access point by using the primary radio; and the access point receives the first message transmitted by the station by using the primary radio.

S330. The access point transmits data based on the first message.

Specifically, after receiving the first message, the access point may learn, based on the first message, a time interval between a time point at which the wake-up radio of the station starts to wake up the primary radio and the time point at which the primary radio is woken up. Therefore, after the access point transmits the wake-up frame to the station, the access point transmits the data to the station after waiting for the time interval. Because the first message transmitted by the station to the access point includes the wake-up latency information, the access point can determine, based on the wake-up latency information, a more accurate time for transmitting the data.

Optionally, in an embodiment, the first message further includes at least one of the following information: channel indication information, wake-up radio operation mode information, and first wake-up frame support information. The channel indication information is used to indicate channel information of the wake-up radio, and the channel information includes a channel bandwidth and/or a channel location of the wake-up radio. The wake-up radio operation mode information indicates an operation mode of the wake-up radio. For example, one bit may be used to carry the wake-up radio operation mode information; and if a value of the bit is set to "0", it represents that the operation mode of the wake-up radio is an always-on mode; or if a value of the bit is set to "1", it represents that the operation mode of the wake-up radio is a periodically-on mode. The first wake-up frame support information is used to indicate whether the station supports reception of the wake-up frame. For example, one bit may be used to carry the first wake-up frame support information; and if a value of the bit is set to "0", it represents that the station does not support reception of the wake-up frame; or if a value of the bit is set to "1", it represents that the station supports reception of the wake-up frame.

Optionally, in an embodiment, the access point receives a probe request (Probe Request) frame transmitted by the station, where the probe request frame carries the first message.

Further, the access point may transmit a second message to the primary radio of the station, where the second message includes at least one of the following information: channel operation information, wake-up frame transmit period information, and second wake-up frame support information. The channel operation information is used to indicate a bandwidth of a channel currently used by the access point and/or a location of the channel and/or transmission mode information. The wake-up frame transmit period information is used to indicate a transmit period of the wake-up frame. The second wake-up frame support information is used to indicate whether the access point supports transmission of the wake-up frame. For example, one bit may be used to carry the second wake-up frame support information; and if a value of the bit is set to "0", it represents that the station does not support transmission of the wake-up frame; or if a value of the bit is set to "1", it represents that the station supports transmission of the wake-up frame.

Optionally, in an embodiment, the access point transmits a beacon (Beacon) frame to the primary radio of the station, where the beacon frame carries the second message. Alternatively, the access point transmits a probe response (Probe Response) frame to the primary radio of the station, where the probe response frame carries the second message.

The foregoing describes in detail the wake-up methods according to the embodiments of this application with reference to FIG. 1 to FIG. 7. The following describes devices according to the embodiments of this application with reference to FIG. 8 to FIG. 16.

Figure 8:
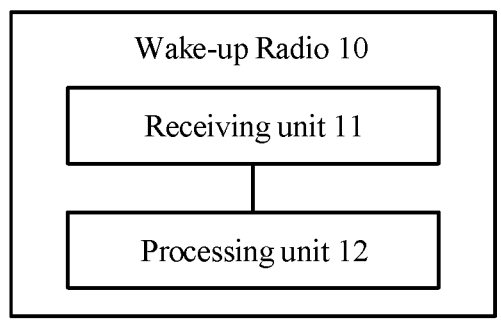
FIG. 8 is a schematic structural diagram of a wake-up radio according to an embodiment of this application.

FIG. 8 is a schematic structural diagram of a wake-up radio according to an embodiment of this application. The wake-up radio is disposed in a station. As shown in FIG. 8, the wake-up radio 10 includes:

a receiving unit 11, configured to receive a first wake-up frame, where the first wake-up frame includes a duration field, and the duration field is used to carry duration information; and a processing unit 12, configured to wake up a primary radio based on the duration information.

Therefore, the wake-up frame received by the wake-up radio according to this embodiment of this application includes the duration information, and the wake-up radio wakes up the primary radio based on the duration information, so that the station can save energy better.

In this embodiment of this application, optionally, the duration information is used to indicate a first time interval between a time point at which the receiving unit completely receives the first wake-up frame and a time point at which the processing unit starts to wake up the primary radio; and the processing unit 12 is specifically configured to start to wake up the primary radio after the first time interval starting from the time point at which the receiving unit 11 completely receives the first wake-up frame.

In this embodiment of this application, optionally, the duration information is used to indicate a second time interval between a time point at which the receiving unit 11 completely receives the first wake-up frame and a time point at which the primary radio is woken up; and the processing unit 12 is specifically configured to start to wake up the primary radio after a third time interval starting from the time point at which the receiving unit 11 completely receives the first wake-up frame, where the third time interval is a difference between the second time interval and a fourth time interval, and the fourth time interval is a time interval between a time point at which the processing unit 12 starts to wake up the primary radio and the time point at which the primary radio is woken up.

In this embodiment of this application, optionally, the station belongs to a target station group in a plurality of station groups, the first wake-up frame further includes a group identifier field, and the group identifier field is used to carry a group identifier; and before the processing unit 12 wakes up the primary radio based on the duration information, the processing unit 12 is further configured to determine that the group identifier carried in the group identifier field is a group identifier of the target station group.

In this embodiment of this application, optionally, the plurality of station groups are obtained by an access point by grouping a plurality of stations based on association identifiers AIDs of the stations, AIDs of all stations in each station group belong to a same AID set, AIDs in any two AID sets are completely different, and a correspondence exists between a group identifier of each station group and an AID set; and the processing unit 12 is further configured to determine, based on the group identifier carried in the group identifier field and the correspondence, that the group identifier carried in the group identifier field is the group identifier of the target station group.

In this embodiment of this application, optionally, values of AIDs in each AID set are continuous.

In this embodiment of this application, optionally, the first wake-up frame further includes a traffic indication map TIM field, the TIM field includes a bitmap field, the bitmap field is used to carry data indication information, and the data indication information is used to indicate whether each station in the target station group has data to be received; and before the processing unit 12 wakes up the primary radio based on the duration information, the processing unit 12 is further configured to determine, based on the data indication information, that the station has data to be received.

In this embodiment of this application, optionally, the first wake-up frame further includes a wake-up frame quantity indication field, the wake-up frame quantity indication field is used to carry wake-up frame quantity indication information, the wake-up frame quantity indication information is used to indicate whether the wake-up radio needs to receive a second wake-up frame in a receive period of the first wake-up frame, and the receiving unit 11 is further configured to receive the second wake-up frame in the receive period when the wake-up frame quantity indication information indicates that the wake-up radio needs to receive the second wake-up frame in the receive period of the first wake-up frame.

The wake-up radio 10 according to this embodiment of this application may correspond to the wake-up radio in the method in the embodiment of this application, and the foregoing other operations and/or functions of each unit in wake-up radio 10 are respectively intended to implement a corresponding step in the method 100. For brevity, details are not described herein.

Therefore, the wake-up frame received by the wake-up radio according to this embodiment of this application includes the duration information, and the wake-up radio wakes up the primary radio based on the duration information, so that the station can save energy better.

Figure 9:
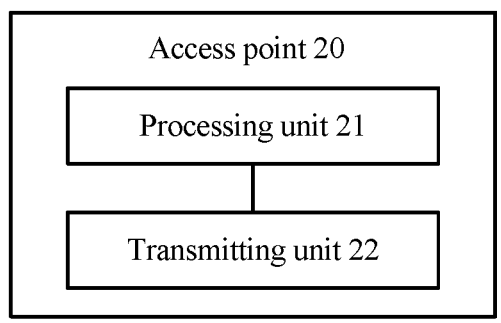
FIG. 9 is a schematic structural diagram of an access point according to an embodiment of this application.

FIG. 9 is a schematic structural diagram of an access point according to an embodiment of this application. As shown in FIG. 9, the access point 20 includes:

a processing unit 21, configured to generate a first wake-up frame, where the first wake-up frame includes a duration field, and the duration field is used to carry duration information, so that a wake-up radio of a station wakes up a primary radio based on the duration information; and a transmitting unit 22, configured to transmit the first wake-up frame.

Therefore, the wake-up frame transmitted by the access point according to this embodiment of this application to the station includes the duration information, so that the wake-up radio of the station wakes up the primary radio based on the duration information, and that the station can save energy better.

In this embodiment of this application, optionally, the duration information is used to indicate a first time interval between a time point at which the wake-up radio completely receives the first wake-up frame and a time point at which the wake-up radio starts to wake up the primary radio.

In this embodiment of this application, optionally, the duration information is used to indicate a second time interval between a time point at which the wake-up radio completely receives the first wake-up frame and a time point at which the primary radio is woken up.

In this embodiment of this application, optionally, the first wake-up frame further includes a group identifier field, and the group identifier field is used to carry a group identifier; and the transmitting unit 22 is specifically configured to transmit the first wake-up frame to each station in a target station group.

In this embodiment of this application, optionally, the processing unit 21 is further configured to group a plurality of stations based on association identifiers AIDs of the stations to obtain a plurality of station groups, where the plurality of station groups include the target station group, AIDs of all stations in each station group belong to a same AID set, AIDs in any two AID sets are completely different, and a correspondence exists between a group identifier of each station group and an AID set.

In this embodiment of this application, optionally, values of AIDs in each AID set are continuous.

In this embodiment of this application, optionally, the first wake-up frame further includes a traffic indication map TIM field, the TIM field includes a bitmap field, the bitmap field is used to carry data indication information, and the data indication information is used to indicate whether each station in the target station group has data to be received.

In this embodiment of this application, optionally, the first wake-up frame further includes a wake-up frame quantity indication field, the wake-up frame quantity indication field is used to carry wake-up frame quantity indication information, and the wake-up frame quantity indication information is used to indicate whether the access point transmits a second wake-up frame in a transmit period of the first wake-up frame.

The access point 20 according to this embodiment of this application may correspond to the access point in the method in the embodiment of this application. In addition, the foregoing other operations and/or functions of each unit in access point 20 are respectively intended to implement a corresponding step of the method 100. For brevity, details are not described herein.

Therefore, the wake-up frame transmitted by the access point according to this embodiment of this application to the station includes the duration information, so that the wake-up radio of the station wakes up the primary radio based on the duration information, and that the station can save energy better.

Figure 10:
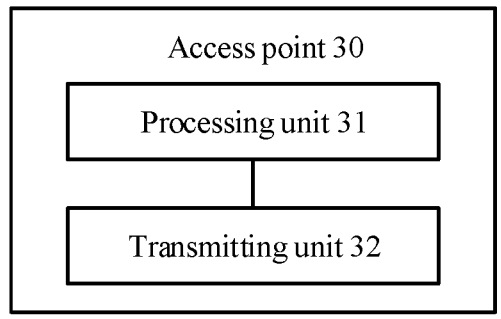
FIG. 10 is a schematic structural diagram of an access point according to another embodiment of this application.

FIG. 10 is a schematic structural diagram of an access point according to another embodiment of this application. As shown in FIG. 10, the access point 30 includes:

a processing unit 31, configured to group a plurality of stations based on association identifiers AIDs of the stations to obtain a plurality of station groups, where AIDs of all stations in each station group belong to a same AID set, AIDs in any two AID sets are completely different, and a correspondence exists between a group identifier of each station group and an AID set; and a transmitting unit 32, configured to transmit a first wake-up frame to a station in a target station group.

Therefore, the access point according to this embodiment of this application determines a station group based on AIDs of stations, and a correspondence exists between a group identifier of the station group and an AID set. A grouping mechanism is simple. Therefore, signaling overheads of the wake-up frame can be reduced.

In this embodiment of this application, optionally, the first wake-up frame includes a group identifier field, and the group identifier field is used to carry a group identifier of the target station group.

In this embodiment of this application, optionally, the first wake-up frame further includes a traffic indication map TIM field, the TIM field includes a bitmap field, the bitmap field is used to carry data indication information, and the data indication information is used to indicate whether each station in the target station group has data to be received.

In this embodiment of this application, optionally, the first wake-up frame further includes a wake-up frame quantity indication field, the first wake-up frame quantity indication field is used to carry wake-up frame quantity indication information, and the first wake-up frame quantity indication information is used to indicate whether the access point transmits a second wake-up frame to the station in the target station group in a transmit period of the first wake-up frame.

The access point 30 according to this embodiment of this application may correspond to the access point in the method in the embodiment of this application. In addition, the foregoing other operations and/or functions of each unit of the access point 30 are respectively intended to implement a corresponding step of the method 200. For brevity, details are not described herein.

Therefore, the access point according to this embodiment of this application determines a station group based on AIDs of stations, and a correspondence exists between a group identifier of the station group and an AID set. A grouping mechanism is simple. Therefore, signaling overheads of the wake-up frame can be reduced.

Figure 11:
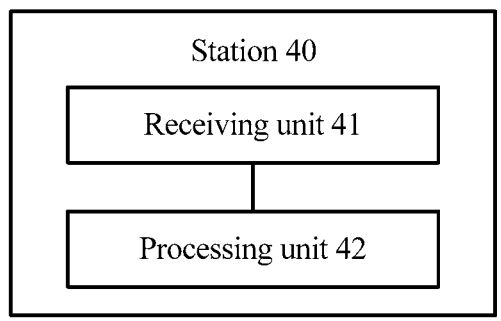
FIG. 11 is a schematic structural diagram of a station according to an embodiment of this application.

FIG. 11 is a schematic structural diagram of a station according to an embodiment of this application. As shown in FIG. 11, the station 40 includes:

a receiving unit 41, configured to receive a first wake-up frame, where the station belongs to a target station group in a plurality of station groups, the first wake-up frame includes a group identifier field, the group identifier field is used to carry a group identifier of the target station group, the plurality of station groups are obtained by an access point by grouping a plurality of stations based on association identifiers AIDs of the stations, AIDs of all stations in each station group belong to a same AID set, AIDs in any two AID sets are completely different, and a correspondence exists between a group identifier of each station group and an AID set; and a processing unit 42, configured to parse the first wake-up frame when determining, based on the group identifier of the target station group and the correspondence, that the first wake-up frame needs to be parsed.

Therefore, the station according to this embodiment of this application belongs to the target station group, the wake-up frame received by the station includes the group identifier field used to carry the group identifier of the target station group, and a correspondence exists between the group identifier and an AID set; and the station determines, based on the group identifier of the target station group and the correspondence, whether the received wake-up frame needs to be parsed. Therefore, signaling overheads of the wake-up frame can be reduced.

In this embodiment of this application, optionally, the first wake-up frame further includes a traffic indication map TIM field, the TIM field includes a bitmap field, the bitmap field is used to carry data indication information, and the data indication information is used to indicate whether each station in the target station group has data to be received; and the processing unit 42 is specifically configured to: when determining, based on the group identifier of the target station group and the correspondence, that the first wake-up frame needs to be parsed, parse the first wake-up frame, and determine, based on the data indication information, whether there is data to be received.

In this embodiment of this application, optionally, the first wake-up frame further includes a wake-up frame quantity indication field, the wake-up frame quantity indication field is used to carry wake-up frame quantity indication information, the wake-up frame quantity indication information is used to indicate whether the access point transmits a second wake-up frame to the station in the target station group in a transmit period of the first wake-up frame, and the receiving unit 41 is further configured to receive the second wake-up frame in the transmit period when the wake-up frame quantity indication information indicates that the access point transmits the second wake-up frame to the station in the target station group in the transmit period of the first wake-up frame.

The station 40 according to this embodiment of this application may correspond to the station in the method in the embodiment of this application. In addition, the foregoing other operations and/or functions of each unit in the station 40 are respectively intended to implement a corresponding step of the method 200. For brevity, details are not described herein.

Therefore, the station according to this embodiment of this application belongs to the target station group, the wake-up frame received by the station includes the group identifier field used to carry the group identifier of the target station group, and a correspondence exists between the group identifier and an AID set; and the station determines, based on the group identifier of the target station group and the correspondence, whether the received wake-up frame needs to be parsed. Therefore, signaling overheads of the wake-up frame can be reduced.

Figure 12:
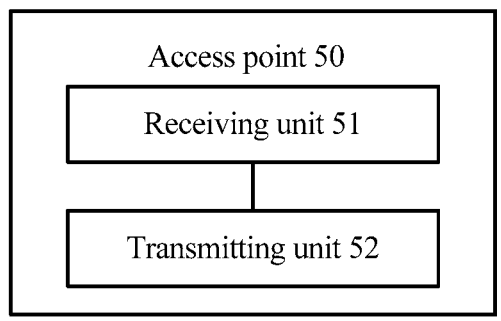
FIG. 12 is a schematic structural diagram of an access point according to still another embodiment of this application.

FIG. 12 is a schematic structural diagram of an access point according to still another embodiment of this application. As shown in FIG. 12, the access point 50 includes:

a receiving unit 51, configured to receive a first message, where the first message includes wake-up latency information, and the wake-up latency information is used to indicate a time interval between a time point at which a wake-up radio of a station successfully and completely receives a wake-up frame transmitted by the access point and a time point at which the wake-up radio wakes up a primary radio of the station; and a transmitting unit 52, further configured to transmit data based on the first message.

Therefore, the transmitted first message received by the access point according to this embodiment of this application includes the wake-up latency information, so that a more accurate time for transmitting the data can be determined based on the wake-up latency information.

In this embodiment of this application, optionally, the first message further includes at least one of the following information: channel indication information, wake-up radio operation mode information, and first wake-up frame support information, where the channel indication information is used to indicate channel information of the wake-up radio, the wake-up radio operation mode information is used to indicate an operation mode of the wake-up radio, and the first wake-up frame support information is used to indicate whether the station supports reception of the wake-up frame.

In this embodiment of this application, optionally, the receiving unit 51 is specifically configured to receive a probe request frame, where the probe request frame carries the first message.

In this embodiment of this application, optionally, the transmitting unit 52 is further configured to transmit a second message, where the second message includes at least one of the following information: channel operation information, wake-up frame transmit period information, and second wake-up frame support information, where the channel operation information is used to indicate information of a channel currently used by the access point, the wake-up frame transmit period information is used to indicate a transmit period of the wake-up frame, and the second wake-up frame support information is used to indicate whether the access point supports transmission of the wake-up frame.

In this embodiment of this application, optionally, the transmitting unit 52 is specifically configured to: transmit a beacon frame, where the beacon frame carries the second message; or transmit a probe response frame, where the probe response frame carries the second message.

The access point 50 according to this embodiment of this application may correspond to the access point in the method in the embodiment of this application. In addition, each unit of the access point 50 and the foregoing other operations and/or functions of each unit of the access point 50 are respectively intended to implement a corresponding step of the method 300. For brevity, details are not described herein.

Therefore, the transmitted first message received by the access point according to this embodiment of this application includes the wake-up latency information, so that a more accurate time for transmitting the data can be determined based on the wake-up latency information.

Figure 13:
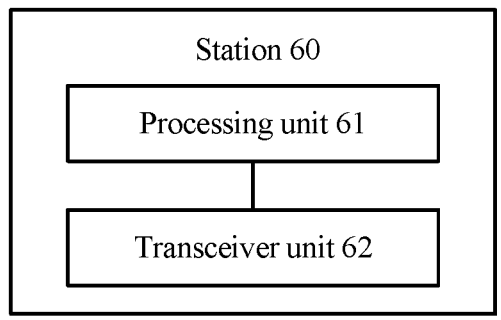
FIG. 13 is a schematic structural diagram of a station according to another embodiment of this application.

FIG. 13 shows a station according to another embodiment of this application. As shown in FIG. 13, the station 60 includes:

a processing unit 61, configured to generate a first message, where the first message includes wake-up latency information, and the wake-up latency information is used to indicate a time interval between a time point at which a wake-up radio of the station successfully and completely receives a wake-up frame transmitted by the access point and a time point at which the wake-up radio wakes up a primary radio of the station; and a transceiver unit 62, configured to transmit the first message.

The first message transmitted by the station according to this application to the access point includes the wake-up latency information. Therefore, the access point can determine, based on the wake-up latency information, a more accurate time for transmitting data and manage wake-up of the station more effectively, and the station can save power better.

In this embodiment of this application, optionally, the first message further includes at least one of the following information: channel indication information, wake-up radio operation mode information, and first wake-up frame support information, where the channel indication information is used to indicate channel information of the wake-up radio, the wake-up radio operation mode information is used to indicate an operation mode of the wake-up radio, and the first wake-up frame support information is used to indicate whether the station supports reception of the wake-up frame.

In this embodiment of this application, optionally, the transceiver unit 62 is specifically configured to transmit a probe request frame, where the probe request frame carries the first message.

In this embodiment of this application, optionally, the transceiver unit 62 is further configured to receive a second message, where the second message includes at least one of the following information: channel operation information, wake-up frame transmit period information, and second wake-up frame support information, where the channel operation information is used to indicate information of a channel currently used by the access point, the wake-up frame transmit period information is used to indicate a transmit period of the wake-up frame, and the second wake-up frame support information is used to indicate whether the access point supports transmission of the wake-up frame.

In this embodiment of this application, optionally, the transceiver unit 62 is specifically configured to: receive a beacon frame, where the beacon frame carries the second message; or receive a probe response frame, where the probe response frame carries the second message.

The station 60 according to this embodiment of this application may correspond to the station in the method in the embodiment of this application. In addition, the foregoing other operations and/or functions of each unit in the station 60 are respectively intended to implement a corresponding step of the method 300. For brevity, details are not described herein.

The first message transmitted by the station according to this application to the access point includes the wake-up latency information. Therefore, the access point can determine, based on the wake-up latency information, a more accurate time for transmitting data and manage wake-up of the station more effectively, and the station can save power better.

Figure 14:
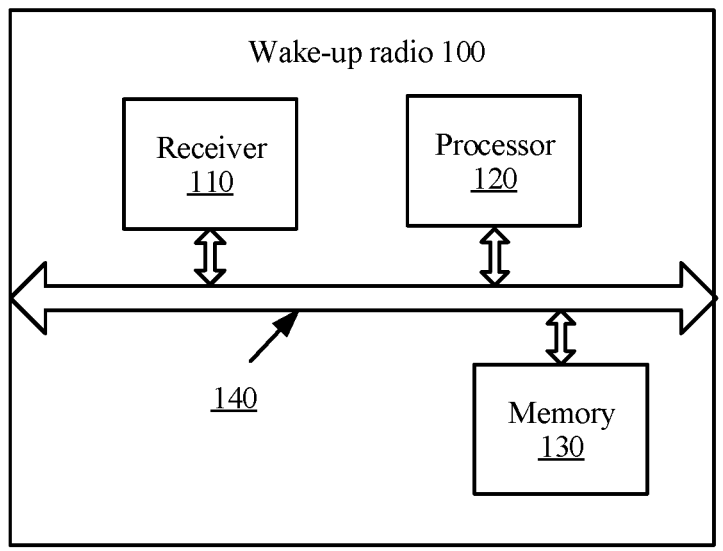
FIG. 14 is a schematic structural diagram of a wake-up radio according to another embodiment of this application.

FIG. 14 is a schematic structural diagram of a wake-up radio according to another embodiment of this application. The wake-up radio 100 in FIG. 14 includes a receiver 110, a processor 120, and a memory 130. The processor 120 controls an operation of the wake-up radio 100, and may be configured to process a signal. The memory 130 may include a read-only memory and a random access memory, and provide an instruction and data to the processor 120. Components of the wake-up radio 100 are coupled together by using a bus system 140. The bus system 140 further includes a power bus, a control bus, and a status signal bus, in addition to a data bus. However, for clear description, various buses in the figure are marked as the bus system 140.

Specifically, the receiver 110 is configured to receive a first wake-up frame, where the first wake-up frame includes a duration field, and the duration field is used to carry duration information; and the processor 120 is configured to wake up a primary radio based on the duration information.

It should be understood that, the wake-up radio 100 according to this embodiment of this application may correspond to the wake-up radio 10 in the embodiment of this application, and may correspond to a corresponding entity performing the method according to the embodiment of this application, and the foregoing and other operations and/or functions of each module in the wake-up radio 100 are respectively intended to implement a corresponding step in the method 100. For brevity, details are not described herein.

Therefore, the wake-up frame received by the wake-up radio according to this embodiment of this application includes the duration information, and the wake-up radio wakes up the primary radio based on the duration information, so that the station can save energy better.

Figure 15:
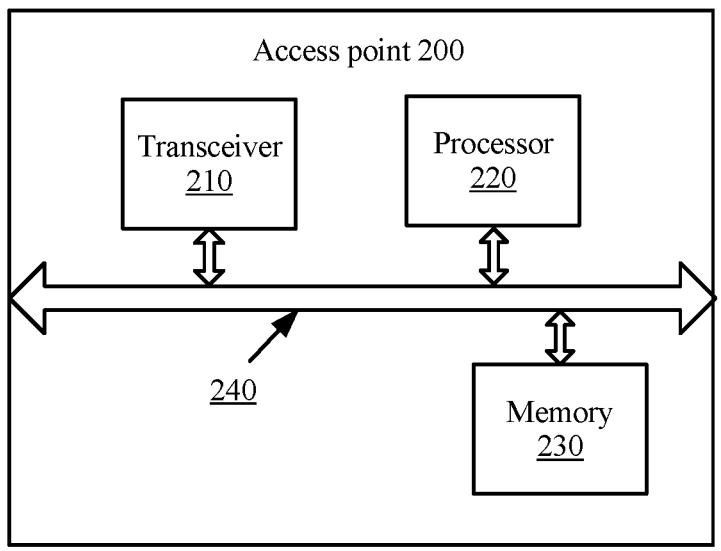
FIG. 15 is a schematic structural diagram of an access point according to still another embodiment of this application.

FIG. 15 is a schematic structural diagram of an access point according to still another embodiment of this application. The access point 200 in FIG. 15 includes a transceiver 210, a processor 220, and a memory 230. The processor 220 controls an operation of the access point 200, and may be configured to process a signal. The memory 230 may include a read-only memory and a random access memory, and provide an instruction and data to the processor 220. All components of the access point 200 are coupled together by using a bus system 240. The bus system 240 further includes a power bus, a control bus, a status signal bus, and the like, in addition to a data bus. However, for clear description, various buses are marked as the bus system 240 in the figure.

Specifically, the processor 220 is configured to generate a first wake-up frame, where the first wake-up frame includes a duration field, and the duration field is used to carry duration information, so that a wake-up radio of a station wakes up a primary radio based on the duration information; and the transceiver 210 is configured to transmit the first wake-up frame.

It should be understood that, the access point 200 according to this embodiment of this application may correspond to the access point 20 in the embodiment of this application, and may correspond to a corresponding entity performing the method according to the embodiment of this application. In addition, the foregoing and other operations and/or functions of each module in the access point 200 are respectively intended to implement a corresponding step of each method in the method 100. For brevity, details are not described herein.

Therefore, the wake-up frame transmitted by the access point according to this embodiment of this application to the station includes the duration information, so that the wake-up radio of the station wakes up the primary radio based on the duration information, and that the station can save energy better.

Alternatively, the processor 220 is configured to group a plurality of stations based on association identifiers AIDs of the stations to obtain a plurality of station groups, where AIDs of all stations in each station group belong to a same AID set, AIDs in any two AID sets are completely different, and a correspondence exists between a group identifier of each station group and an AID set; and the transceiver 210 is configured to transmit a first wake-up frame to a station in a target station group.

It should be understood that, the access point 200 according to this embodiment of this application may correspond to the access point 30 in the embodiment of this application, and may correspond to a corresponding entity performing the method according to the embodiment of this application. In addition, the foregoing and other operations and/or functions of each module in the access point 200 are respectively intended to implement a corresponding step of each method in the method 200. For brevity, details are not described herein.

Therefore, the access point according to this embodiment of this application determines a station group based on AIDs of stations, and a correspondence exists between a group identifier of the station group and an AID set. A grouping mechanism is simple. Therefore, signaling overheads of the wake-up frame can be reduced.

Alternatively, the transceiver 210 is configured to receive a first message, where the first message includes wake-up latency information, and the wake-up latency information is used to indicate a time interval between a time point at which a wake-up radio of a station successfully and completely receives a wake-up frame transmitted by the access point and a time point at which the wake-up radio wakes up a primary radio of the station; and the transceiver 210 is further configured to transmit data based on the first message.

It should be understood that, the access point 200 according to this embodiment of this application may correspond to the access point 50 in the embodiment of this application, and may correspond to a corresponding entity performing the method according to the embodiment of this application. In addition, the foregoing and other operations and/or functions of each module in the access point 200 are respectively intended to implement a corresponding step of each method in the method 300. For brevity, details are not described herein.

Therefore, the transmitted first message received by the access point according to this embodiment of this application includes the wake-up latency information, so that a more accurate time for transmitting the data can be determined based on the wake-up latency information.

Figure 16:
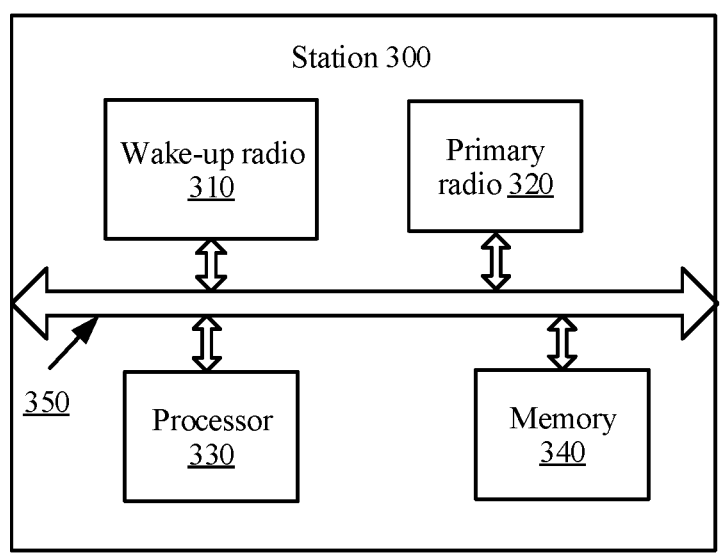
FIG. 16 is a schematic structural diagram of a station according to still another embodiment of this application.

FIG. 16 is a schematic structural diagram of a station according to still another embodiment of this application. The station 300 in FIG. 16 includes a wake-up radio 310, a primary radio 320, a processor 330, and a memory 340. The processor 330 controls an operation of the station 300, and may be configured to process a signal. The memory 340 may include a read-only memory and a random access memory, and provide an instruction and data to the processor 330. All components of the station 300 are coupled together by using a bus system 350. The bus system 350 further includes a power bus, a control bus, a status signal bus, and the like, in addition to a data bus. However, for clear description, various buses are marked as the bus system 350 in the figure.

Specifically, the wake-up radio 310 is configured to receive a first wake-up frame, where the station belongs to a target station group in a plurality of station groups, the first wake-up frame includes a group identifier field, the group identifier field is used to carry a group identifier of the target station group, the plurality of station groups are obtained by an access point by grouping a plurality of stations based on association identifiers AIDs of the stations, AIDs of all stations in each station group belong to a same AID set, AIDs in any two AID sets are completely different, and a correspondence exists between a group identifier of each station group and an AID set; and the processor 330 is configured to parse the first wake-up frame when determining, based on the group identifier of the target station group and the correspondence, that the first wake-up frame needs to be parsed.

It should be understood that, the station 300 according to this embodiment of this application may correspond to the station 40 in the embodiment of this application, and may correspond to a corresponding entity performing the method according to the embodiment of this application. In addition, the foregoing and other operations and/or functions of each module in the station 300 are respectively intended to implement a corresponding step of each method in the method 200. For brevity, details are not described herein.

Therefore, the station according to this embodiment of this application belongs to the target station group, the wake-up frame received by the station includes the group identifier field used to carry the group identifier of the target station group, and a correspondence exists between the group identifier and an AID set; and the station determines, based on the group identifier of the target station group and the correspondence, whether the received wake-up frame needs to be parsed. Therefore, signaling overheads of the wake-up frame can be reduced.

Alternatively, the processor 330 is configured to generate a first message, where the first message includes wake-up latency information, and the wake-up latency information is used to indicate a time interval between a time point at which the wake-up radio 310 of the station successfully and completely receives a wake-up frame transmitted by the access point and a time point at which the wake-up radio 310 wakes up the primary radio 320 of the station; and the primary radio 320 is configured to transmit the first message.

It should be understood that, the station 300 according to this embodiment of this application may correspond to the station 60 in the embodiment of this application, and may correspond to a corresponding entity performing the method according to the embodiment of this application. In addition, the foregoing and other operations and/or functions of each module in the station 300 are respectively intended to implement a corresponding step of each method in the method 300. For brevity, details are not described herein.

The first message transmitted by the station according to this application to the access point includes the wake-up latency information. Therefore, the access point can determine, based on the wake-up latency information, a more accurate time for transmitting data and manage wake-up of the station more effectively, and the station can save power better.

It should be understood that, the processor in the embodiments of this application may be a central processing unit (Central Processing Unit, CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor or the processor may be any conventional processor, or the like.

The memory may include a read-only memory and a random access memory, and provide an instruction and data to the processor. A part of the memory may further include a non-volatile random access memory. For example, the memory may further store information about a device type.

In an implementation process, each step of the foregoing method may be completed by using an integrated logical circuit of hardware in the processor or an instruction in a form of software. The steps of the methods disclosed with reference to the embodiments of this application may be directly performed and completed by a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory. The processor reads information in the memory and completes the steps in the foregoing methods in combination with hardware of the processor. To avoid repetition, details are not described herein.

It should be understood that "one embodiment" or "an embodiment" mentioned in the whole specification means that particular features, structures, or characteristics related to the embodiment are included in at least one embodiment of this application. Therefore, "in one embodiment" or "in an embodiment" that appears throughput the whole specification does not necessarily mean a same embodiment. Moreover, the particular characteristic, structure or property may be combined in one or more embodiments in any proper manner.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, method steps and units may be implemented by electronic hardware, computer software, or a combination thereof. To clearly describe interchangeability between the hardware and the software, the foregoing has generally described steps and compositions of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The method or step described in the embodiments disclosed in this specification may be implemented by hardware, software program executed by the processor, or combination of hardware and software program. The software program may be stored in a random access memory (Random Access Memory, RAM), memory, a read-only memory (Read-Only Memory, ROM), an electrically programmable read-only memory (Electrically Programmable Read-Only Memory, EPROM), an electrically erasable programmable read-only memory (Electrically Erasable Programmable Read-Only Memory, EEPROM), a register, a hard disk, a removable magnetic disk, a compact disc read-only memory (Compact Disc Read-Only Memory, CD-ROM), or a storage medium in any other forms well-known in the technical field.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

This application is described in detail with reference to the accompanying drawings and in combination with the preferred embodiments, but this application is not limited thereto. Various equivalent modifications or replacements can be made to the embodiments of this application by a person of ordinary skill in the art without departing from the spirit and essence of this application, and the modifications or replacements shall fall within the scope of this application.

What is claimed is:

1. A wake-up method, wherein the method is performed by a wake-up radio of a station, and the method comprises:
receiving, by the wake-up radio, a first wake-up frame, wherein the first wake-up frame comprises a duration field, and the duration field is used to carry duration information; and
waking up, by the wake-up radio, a primary radio based on the duration information,
wherein the duration information is used to indicate a first time interval between a time point at which the wake-up radio completely receives the first wake-up frame and a time point at which the wake-up radio starts to wake up the primary radio; and
the waking up, by the wake-up radio, the primary radio based on the duration information further comprises:

starting, by the wake-up radio, to wake up the primary radio after the first time interval starting from the time point at which the first wake-up frame is completely received.

2. The method according to claim 1, wherein the duration information is used to indicate a second time interval between a time point at which the wake-up radio completely receives the first wake-up frame and a time point at which the primary radio is woken up; and
the waking up, by the wake-up radio, the primary radio based on the duration information comprises:
starting, by the wake-up radio, to wake up the primary radio after a third time interval starting from the time point at which the first wake-up frame is completely received, wherein the third time interval is a difference between the second time interval and a fourth time interval, and the fourth time interval is a time interval between a time point at which the wake-up radio starts to wake up the primary radio and the time point at which the primary radio is woken up.

3. The method according to claim 1, wherein the station belongs to a target station group in a plurality of station groups, the first wake-up frame further comprises a group identifier field, and the group identifier field is used to carry a group identifier; and
before the waking up, by the wake-up radio, the primary radio based on the duration information, the method further comprises:
determining, by the wake-up radio, that the group identifier carried in the group identifier field is a group identifier of the target station group.

4. The method according to claim 3, wherein the plurality of station groups are obtained by an access point by grouping a plurality of stations based on association identifiers (AIDs) of the stations, AIDs of all stations in each station group belong to a same AID set, elements in any two AID sets are completely different, and a correspondence exists between a group identifier of each station group and an AID set; and
the determining, by the wake-up transceiver, that the group identifier carried in the group identifier field is a group identifier of the target station group comprises:
determining, by the wake-up transceiver based on the group identifier carried in the group identifier field and the correspondence, that the group identifier carried in the group identifier field is the group identifier of the target station group.

5. The method according to claim 3, wherein the first wake-up frame further comprises a traffic indication map (TIM) field, the TIM field comprises a bitmap field, the bitmap field is used to carry data indication information, and the data indication information is used to indicate whether each station in the target station group has data to be received; and
before the waking up, by the wake-up radio, the primary radio based on the duration information, the method further comprises:
determining, by the wake-up radio based on the data indication information, that the station has data to be received.

6. The method according to claim 1, wherein the first wake-up frame further comprises a wake-up frame quantity indication field, the wake-up frame quantity indication field is used to carry wake-up frame quantity indication information, the wake-up frame quantity indication information is used to indicate whether the wake-up radio needs to receive a second wake-up frame in a receive period of the first wake-up frame, and the method further comprises:
when the wake-up frame quantity indication information indicates that the wake-up radio needs to receive the second wake-up frame in the receive period of the first wake-up frame, receiving, by the wake-up radio, the second wake-up frame in the receive period.

7. A wake-up method, wherein the method comprises:
generating, by an access point, a first wake-up frame, wherein the first wake-up frame comprises a duration field, and the duration field is used to carry duration information, the wake-up frame is used to instruct a wake-up radio of a station wakes up a primary radio based on the duration information; and
transmitting, by the access point, the first wake-up frame, wherein the duration information is used to indicate a first time interval between a time point at which the wake-up radio completely receives the first wake-up frame and a time point at which the wake-up radio starts to wake up the primary radio.

8. The method according to claim 7, wherein the duration information is used to indicate a second time interval between a time point at which the wake-up radio completely receives the first wake-up frame and a time point at which the primary radio is woken up.

9. The method according to claim 7, wherein the first wake-up frame further comprises a group identifier field, and the group identifier field is used to carry a group identifier; and
the transmitting, by the access point, the first wake-up frame comprises:
transmitting, by the access point, the first wake-up frame to each station in a target station group.

10. The method according to claim 9, wherein the method further comprises:
grouping, by the access point, a plurality of stations based on association identifiers (AIDs) of the stations to obtain a plurality of station groups, wherein the plurality of station groups comprise the target station group, AIDs of all stations in each station group belong to a same AID set, elements in any two AID sets are completely different, and a correspondence exists between a group identifier of each station group and an AID set.

11. The method according to claim 9, wherein the first wake-up frame further comprises a traffic indication map (TIM) field, the TIM field comprises a bitmap field, the bitmap field is used to carry data indication information, and the data indication information is used to indicate whether each station in the target station group has data to be received.

12. The method according to claim 7, wherein the first wake-up frame further comprises a wake-up frame quantity indication field, the wake-up frame quantity indication field is used to carry wake-up frame quantity indication information, and the wake-up frame quantity indication information is used to indicate whether the access point transmits a second wake-up frame in a transmit period of the first wake-up frame.

13. A wake-up radio, wherein the wake-up radio is disposed in a station, and the wake-up radio comprises:
a receiver, configured to receive a first wake-up frame, wherein the first wake-up frame comprises a duration field, and the duration field is used to carry duration information; and
a processor, configured to wake up a primary radio based on the duration information, wherein the duration information is used to indicate a first time interval between a time point at which the receiver completely receives the first wake-up frame and a time point at which the processor starts to wake up the primary radio; and the processor is specifically configured to:

start to wake up the primary radio after the first time interval starting from the time point at which the receiver completely receives the first wake-up frame.

14. The wake-up radio according to claim 13, wherein the duration information is used to indicate a second time interval between a time point at which the receiver completely receives the first wake-up frame and a time point at which the primary radio is woken up; and the processor is specifically configured to:

start to wake up the primary radio after a third time interval starting from the time point at which the receiver completely receives the first wake-up frame, wherein the third time interval is a difference between the second time interval and a fourth time interval, and the fourth time interval is a time interval between a time point at which the processor starts to wake up the primary radio and the time point at which the primary radio is woken up.

15. The wake-up radio according to claim 13, wherein the station belongs to a target station group in a plurality of station groups, the first wake-up frame further comprises a group identifier field, and the group identifier field is used to carry a group identifier; and before the processor wakes up the primary radio based on the duration information, the processor is further configured to:

determine that the group identifier carried in the group identifier field is a group identifier of the target station group.

16. The wake-up radio according to claim 15, wherein the first wake-up frame further comprises a traffic indication map (TIM) field, the TIM field comprises a bitmap field, the bitmap field is used to carry data indication information, and the data indication information is used to indicate whether each station in the target station group has data to be received; and before the processor wakes up the primary radio based on the duration information, the processor is further configured to:

determine, based on the data indication information, that the station has data to be received.

17. The wake-up radio according to claim 13, wherein the first wake-up frame further comprises a wake-up frame quantity indication field, the wake-up frame quantity indication field is used to carry wake-up frame quantity indication information, the wake-up frame quantity indication information is used to indicate whether the wake-up radio needs to receive a second wake-up frame in a receive period of the first wake-up frame, and the receiver is further configured to:

when the wake-up frame quantity indication information indicates that the wake-up radio needs to receive the second wake-up frame in the receive period of the first wake-up frame, receive the second wake-up frame in the receive period.

* * * * *